US012666380B2

(12) United States Patent
Lin et al.

(10) Patent No.: US 12,666,380 B2
(45) Date of Patent: Jun. 23, 2026

(54) TIME ALIGNMENT MANAGEMENT

(71) Applicant: Telefonaktiebolaget LM Ericsson (publ), Stockholm (SE)

(72) Inventors: Zhipeng Lin, Nanjing (CN); Muhammad Ali Kazmi, Sundbyberg (SE); Santhan Thangarasa, Vällingby (SE); Kazuyoshi Uesaka, Kawasaki (JP); Andreas Höglund, Solna (SE); Jan Christoffersson, Luleå (SE); Henrik Enbuske, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 346 days.

(21) Appl. No.: 18/548,352

(22) PCT Filed: Mar. 7, 2022

(86) PCT No.: PCT/CN2022/079529
§ 371 (c)(1),
(2) Date: Aug. 30, 2023

(87) PCT Pub. No.: WO2022/188741
PCT Pub. Date: Sep. 15, 2022

(65) Prior Publication Data
US 2024/0147397 A1     May 2, 2024

(30) Foreign Application Priority Data
Mar. 9, 2021   (WO) ................ PCT/CN2021/079705

(51) Int. Cl.
*H04W 56/00*        (2009.01)
*H04W 76/27*        (2018.01)
(52) U.S. Cl.
CPC ........ *H04W 56/0045* (2013.01); *H04W 76/27* (2018.02)

(58) Field of Classification Search
CPC ... H04W 56/0045; H04W 76/27; Y02D 30/70
See application file for complete search history.

(56) References Cited

U.S. PATENT DOCUMENTS

2021/0307055 A1*  9/2021  Tsai ...................... H04W 76/30
2021/0315049 A1*  10/2021  Wei ...................... H04W 76/27
(Continued)

FOREIGN PATENT DOCUMENTS

| CN | 111771418 A | 10/2020 |
|---|---|---|
| CN | 111869279 A | 10/2020 |
| WO | 2020102481 A1 | 5/2020 |

OTHER PUBLICATIONS

3GPP TSG-RAN WG2 Meeting #113 electronic; R2-2101837; Source: Asia Pacific Telecom, FGI; Title: Beam operation for CG-SDT; Online, Jan. 25-Feb. 5, 2021 (Year: 2021).*
(Continued)

*Primary Examiner* — Mohammed S Chowdhury
(74) *Attorney, Agent, or Firm* — Murphy, Bilak & Homiller, PLLC

(57) ABSTRACT

The present disclosure is related to methods, user equipments (UEs), and network nodes for managing time alignment (TA). The method at a UE for managing TA related configuration comprises: receiving, from a network node, one or more TA related configurations; determining a TA related configuration from the received one or more TA related configurations at least partially based on at least one of a beam in which the UE is currently camped, a reference signal which is currently detected by the UE, and a configured grant (CG) configuration which is currently applied at the UE; and applying the determined TA related configuration.

20 Claims, 10 Drawing Sheets

500

One or more TA related configurations are received from a network node — S510

A TA related configuration is determined from the received one or more TA related configurations at least partially based on at least one of a beam in which the UE is currently camped, a reference signal which is currently detected by the UE, and a configured grant (CG) configuration which is currently applied at the UE — S520

The determined TA related configuration is applied — S530

(56)                    References Cited

U.S. PATENT DOCUMENTS

2024/0080785 A1*  3/2024  Shi ......................... H04W 76/27
2024/0098797 A1*  3/2024  Liu ...................... H04W 74/006

OTHER PUBLICATIONS

3GPP TSG-RAN WG2 Meeting #113 electronic; R2-2101835; Source: Asia Pacific Telecom, FGI; Title: Discussion on CG-SDT configuration; Online, Jan. 25-Feb. 5, 2021 (Year: 2021).*
3GPP TSG-RAN WG2 Meeting #113e; R2-2102090; Title: LS on uplink timing alignment for small data transmissions; Work Item: NR_SmallData_INACTIVE-Core; eMeeting, Jan. 25-Feb. 5, 2021. (Year: 2021).*
3GPP, "3rd Generation Partnership Project; Technical Specification Group Radio Access Network; NR; Medium Access Control (MAC) protocol specification (Release 16)", 3GPP TS 38.321 V16.2.1, Sep. 2020, 1-154.
3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, 1-921.
Huawei, et al., "Small data transmission with CG-based scheme", 3GPP TSG-RAN WG2 #113-e, R2-2101213, E-meeting, Jan. 25-Feb. 5, 2021, 1-9.
Unknown, Author, "LS on uplink timing alignment for small data transmissions", 3GPP TSG-RAN WG2 Meeting #113e R2-2102090, eMeeting, Jan. 25-Feb. 5, 2021, 1-2.
Unknown, Author, "Work Item on NR smalldata transmissions in INACTIVE state", ZTE Corporation, 3GPP TSG RAN Meeting #88e, RP-201305 (Update of RP-193252), eMeeting, Jun. 29-Jul. 3, 2020, 1-5.
Asia Pacific Telecom, FGI, "Beam operation for CG-SDT", 3GPP TSG-RAN WG2 Meeting #113 electronic, R2-2101837, Online, Jan. 25-Feb. 5, 2021, 1-3.
Samsung, "Configured Grant based Small Data Transmission", 3GPP TSG-RAN2 Meeting #112 Electronic, R2-2009094, Nov. 2-Nov. 13, 2020, 1-8.
Vivo, "Supporting small data transmission via CG configuration", 3GPP TSG-RAN WG2 Meeting 5113-electronic, R2-2100142, Online, Jan. 25-Feb. 5, 2021, 1-4.

* cited by examiner $$(N_{TA} + N_{TA,offset})T_c$$

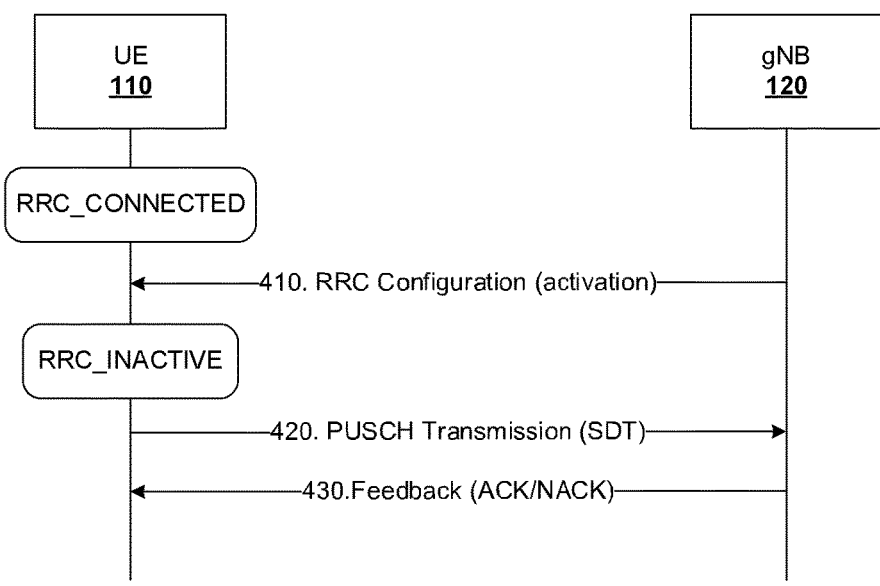

Configured Grant-based SDT

FIG. 4

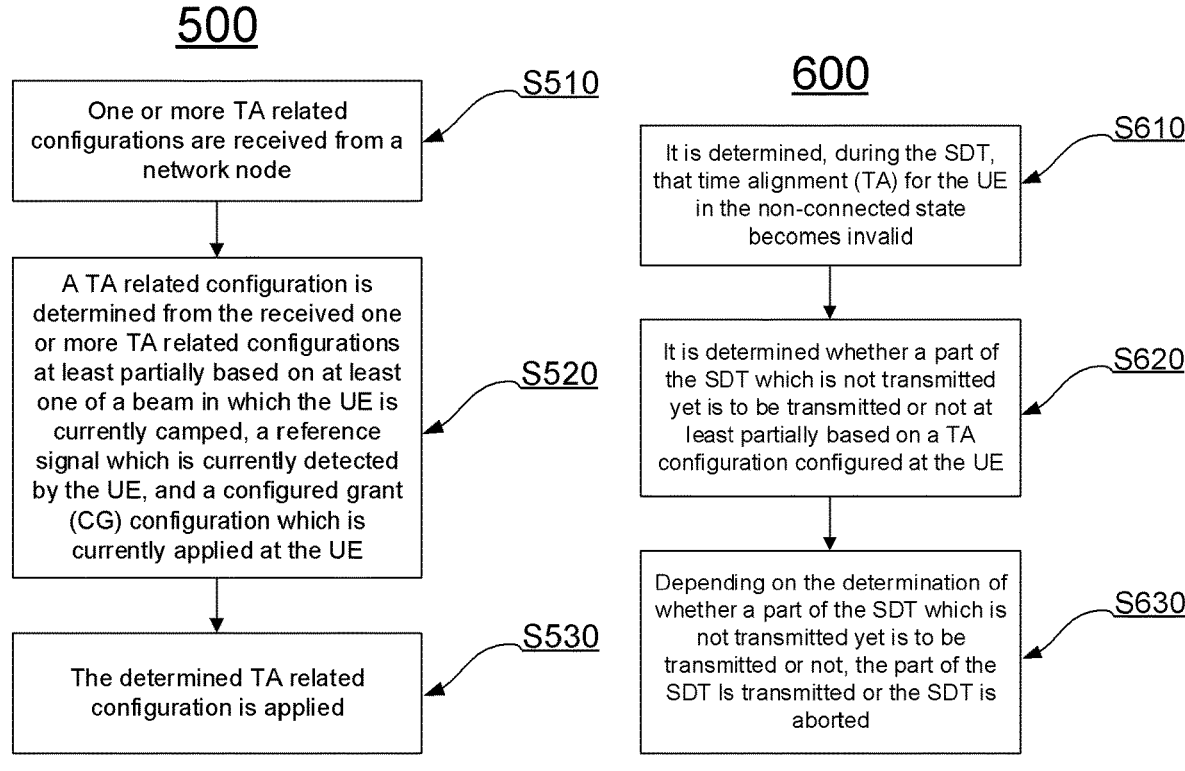

500

S510 — One or more TA related configurations are received from a network node

S520 — A TA related configuration is determined from the received one or more TA related configurations at least partially based on at least one of a beam in which the UE is currently camped, a reference signal which is currently detected by the UE, and a configured grant (CG) configuration which is currently applied at the UE S530 — The determined TA related configuration is applied

600

S610 — It is determined, during the SDT, that time alignment (TA) for the UE in the non-connected state becomes invalid S620 — It is determined whether a part of the SDT which is not transmitted yet is to be transmitted or not at least partially based on a TA configuration configured at the UE S630 — Depending on the determination of whether a part of the SDT which is not transmitted yet is to be transmitted or not, the part of the SDT Is transmitted or the SDT is aborted

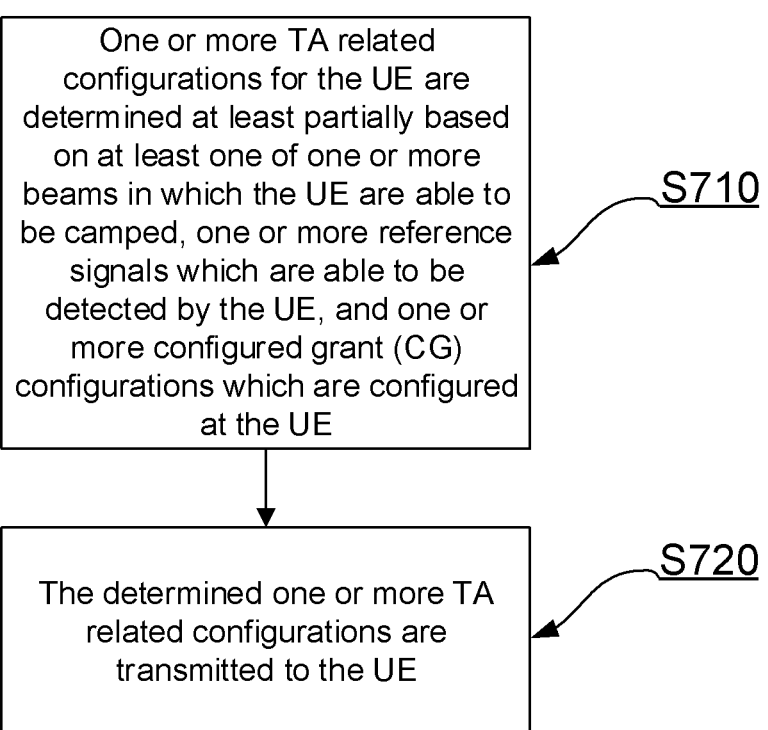

One or more TA related configurations for the UE are determined at least partially based on at least one of one or more beams in which the UE are able to be camped, one or more reference signals which are able to be detected by the UE, and one or more configured grant (CG) configurations which are configured at the UE

S710

The determined one or more TA related configurations are transmitted to the UE

TIME ALIGNMENT MANAGEMENT

TECHNICAL FIELD

The present disclosure is related to the field of telecommunication, and in particular, to methods, user equipments (UEs), and network nodes for managing time alignment (TA).

BACKGROUND

With the development of the electronic and telecommunications technologies, mobile devices, such as mobile phones, smart phones, laptops, tablets, vehicle mounted devices, Internet of Things (IoT) devices (such as, sensors), become an important part of our daily lives. To support a numerous number of mobile devices, a highly efficient Radio Access Network (RAN), such as a fifth generation (5G) New Radio (NR) RAN, is proposed.

5G NR RAN needs to support services that typically require only infrequent small data traffic. Examples of such services may include traffic from instant messaging (IM) services like WhatsApp and WeChat, heart-beat traffic from IM/email clients and other apps, push notifications from various apps, industrial wireless sensors transmitting temperature, pressure data periodically, etc.

Further, 5G NR RAN supports the RRC_INACTIVE state, and UEs with infrequent (periodic and/or non-periodic) data transmission are generally maintained by the network in the RRC_CONNECTED state. Until NR Rel-16, the RRC_INACTIVE state does not support data transmission. Hence, the UE has to resume the connection (i.e., move to the RRC_CONNECTED state) for any downlink (DL) and uplink (UL) data. A connection setup and a subsequent release to the RRC_INACTIVE state has to happen for each data transmission regardless of how small and infrequent the data packets are. This results in unnecessary power consumption and signaling overhead. The signaling overhead for setting up connections before each transmission can sometimes be even greater than the size of the actual data payload. To reduce the signaling overhead and improve UE battery life, in NR Rel-17, a work item on NR small data transmission (SDT) in RRC_INACTIVE state is ongoing.

SUMMARY

According to a first aspect of the present disclosure, a method at a user equipment (UE) for managing time alignment (TA) related configuration is provided. The method comprises: receiving, from a network node, one or more TA related configurations; determining a TA related configuration from the received one or more TA related configurations at least partially based on at least one of a beam in which the UE is currently camped, a reference signal which is currently detected by the UE, and a configured grant (CG) configuration which is currently applied at the UE; and applying the determined TA related configuration.

In some embodiments, the one or more TA related configurations are related to small data transmission (SDT) at the UE in a non-connected state. In some embodiments, each of the TA related configurations comprises one or more criteria for checking validity of the TA at the UE. In some embodiments, the one or more criteria comprises at least one of: a TA timer; a Reference Signal Received Power (RSRP) related configuration; a Reference Signal Received Quality (RSRQ) related configuration; a Signal to Interference plus Noise Ratio (SINR) related configuration; a Synchronous Signal Block (SSB) or Channel State Information Reference Signal (CSI-RS) related configuration; and a UE position related configuration. In some embodiments, the one or more TA related configurations are received via one or more messages transmitted by the network node, wherein the one or more messages comprise at least one of: a broadcasted Radio Resource Control (RRC) message; an RRC message dedicated for the UE only; a Medium Access Control (MAC) Protocol Data Unit (PDU) message; and a Downlink Control Information (DCI) message. In some embodiments, the RRC message dedicated for the UE only is an RRC release message which triggers the UE to transition into the RRC INACTIVE state or the RRC IDLE state.

In some embodiments, the beam is a beam in which a Synchronous Signal Block (SSB), a Channel State Information-Reference Signal (CSI-RS), a Positioning Reference Signal (PRS), or a Demodulation Reference Signal (DMRS) is detected by the UE and for which the validity of TA is to be checked by the UE. In some embodiments, the step of receiving, from a network node, one or more TA related configurations comprises: receiving, from the network node, a first TA related configuration which is associated with a first set of beams comprising the beam in which the UE is currently camped and/or which is associated with a first set of reference signals comprising the reference signal which is currently detected by the UE, wherein the step of determining a TA related configuration comprises: determining the first TA related configuration as the determined TA related configuration.

In some embodiments, the first set of beams comprises all beams from the network node and/or the first set of reference signals comprises all reference signals from the network node. In some embodiments, all beams from the network node comprise one or more second sets of beams which are different from the first set of beams and/or all reference signals from the network node comprise one or more second sets of reference signals which are different from the first set of reference signals. In some embodiments, the step of receiving, from the network node, a first TA related configuration comprises: receiving, from the network node, the first TA related configuration and one or more second TA related configurations, which are associated with the one or more second sets of beams and/or the one or more second sets of reference signals, respectively. In some embodiments, the first TA related configuration has a value which is set independently from those of the one or more second TA related configurations.

In some embodiments, the association between the sets of beams and/or the sets of reference signals and the TA related configurations is signaled by the network node via an RRC message. In some embodiments, the association between the sets of beams and/or the sets of reference signals and the TA related configurations is determined by the UE at least partially based on one or more RSRP related thresholds in the one or more TA related configurations signaled by the network node. In some embodiments, the association is determined as follows: associating a TA related configuration with a beam and/or a reference signal in response to determining that the beam and/or the reference signal has a measured RSRP equal to or greater than a first RSRP threshold and less than a second RSRP threshold; and associating another TA related configuration with the beam and/or the reference signal in response to determining that the beam and/or the reference signal has a measured RSRP equal to or greater than the second RSRP threshold. In some embodiments, the association is determined as follows: associating a TA related configuration with a set of beams and/or a set of reference signals in response to determining that the set of beams and/or the set of reference signals has one or more statistics values of RSRP which meet the one or more RSRP related thresholds in the one or more TA related configurations signaled by the network node. In some embodiments, the statistics values comprise at least one of: the maximum synchronous signal (SS)—RSRP for the set of beams and/or the set of reference signals; the minimum SS-RSRP for the set of beams and/or the set of reference signals; the average SS-RSRP for the set of beams and/or the set of reference signals; the median SS-RSRP for the set of beams and/or the set of reference signals; the maximum SS-RSRP change for the set of beams and/or the set of reference signals; the minimum SS-RSRP change for the set of beams and/or the set of reference signals; the average SS-RSRP change for the set of beams and/or the set of reference signals; the median SS-RSRP change for the set of beams and/or the set of reference signals; and whether a same beam has the maximum and/or minimum SS-RSRP and/or SS-RSRP change in a current SS-RSRP measurement as in a previous SS-RSRP measurement. In some embodiments, for each beam and/or reference signal, there are one or more RSRP related thresholds which are set independently from those for other beams and/or reference signals.

In some embodiments, the step of receiving, from a network node, one or more TA related configurations comprises: receiving, from the network node, a first TA related configuration used for a first configured grant (CG) configuration which is currently applied at the UE, wherein the step of determining a TA related configuration comprises: determining the first TA related configuration as the determined TA related configuration. In some embodiments, the first TA related configuration is used for all CG configurations configured at the UE comprising the first CG configuration. In some embodiments, there are one or more second CG configurations configured at the UE which are different from the first CG configuration, wherein the step of receiving, from the network node, a first TA related configuration comprises: receiving, from the network node, the first TA related configuration and one or more third TA related configurations, which are used for the one or more second CG configurations, respectively. In some embodiments, the first TA related configuration has a value which is set independently from those of the one or more third TA related configurations. In some embodiments, the association between the CG configurations and the TA related configurations is signaled by the network node via an RRC message. In some embodiments, the association between the CG configurations and the TA related configurations is determined by the UE at least partially based on one or more RSRP related thresholds in the one or more TA related configurations signaled by the network node. In some embodiments, the association is determined as follows: associating a TA related configuration with a CG configuration in response to determining that a beam and/or a reference signal associated with the CG configuration has an RSRP equal to or greater than a first RSRP threshold and less than a third RSRP threshold; and associating another TA related configuration with the CG configuration in response to determining that the beam and/or the reference signal associated with the CG configuration has an RSRP equal to or greater than the third RSRP threshold.

In some embodiments, the association is determined as follows: associating a TA related configuration with a CG configuration in response to determining that a set of beams and/or a set of reference signals associated with the CG configuration has one or more statistics values of RSRP which meet one or more RSRP related thresholds in the one or more TA related configurations signaled by the network node. In some embodiments, the statistics values comprise at least one of: the maximum SS-RSRP for the set of beams and/or the set of reference signals; the minimum SS-RSRP for the set of beams and/or the set of reference signals; the average SS-RSRP for the set of beams and/or the set of reference signals; the median SS-RSRP for the set of beams and/or the set of reference signals; the maximum SS-RSRP range for the set of beams and/or the set of reference signals; the minimum SS-RSRP range for the set of beams and/or the set of reference signals; the average SS-RSRP range for the set of beams and/or the set of reference signals; the median SS-RSRP range for the set of beams and/or the set of reference signals; and whether a same beam and/or a reference signal has the maximum and/or minimum SS-RSRP and/or SS-RSRP change in a current SS-RSRP measurement as in a previous SS-RSRP measurement.

In some embodiments, there are one or more RSRP related thresholds for each CG configuration which are set independently from those for other CG configurations. In some embodiments, before the step of applying the determined TA related configuration, the method further comprises: determining whether one or more criteria with regard to beam and/or reference signal are met or not, wherein the step of applying the determined TA related configuration comprises: selectively applying one or more parameters of the determined TA related configuration based on the determination of whether the one or more criteria with regard to beam and/or reference signal are met or not.

In some embodiments, the one or more criteria with regard to beam comprise at least one of: whether the beam has a beam width greater than a threshold; and whether the number of detected or configured beams at the UE is greater than a threshold. In some embodiments, the one or more parameters comprise RSRP related parameters. In some embodiments, the one or more parameters comprise no parameter for TA timer.

According to a second aspect of the present disclosure, a method at a user equipment (UE) for small data transmission (SDT) in a non-connected state is provided. The method comprises: determining, during the SDT, that time alignment (TA) for the UE in the non-connected state becomes invalid; determining whether a part of the SDT which is not transmitted yet is to be transmitted or not at least partially based on a TA configuration configured at the UE; and transmitting the part of the SDT or aborting the SDT depending on the determination of whether a part of the SDT which is not transmitted yet is to be transmitted or not.

In some embodiments, the step of determining whether a part of the SDT which is not transmitted yet is to be transmitted or not at least partially based on a TA configuration configured at the UE comprises: determining whether a part of the SDT which is not transmitted yet is to be transmitted or not based on one or more criteria comprising at least one of: whether a TA timer in the TA configuration is expired or not; whether a measured SS-RSRP change is greater than an RSRP change threshold in the TA configuration or not; and whether a time gap until the remaining transmissions is greater than a threshold in the TA configuration or not. In some embodiments, the step of transmitting the part of the SDT or aborting the SDT depending on the determination comprises: transmitting the part of the SDT in response to determining that the measured SS-RSRP is greater than the RSRP threshold in the TA configuration; or aborting the SDT in response to determining that the measured SS-RSRP is equal to or less than the RSRP threshold in the TA configuration.

In some embodiments, after the step of aborting the SDT, the method further comprises: resuming the SDT in response to determining that the TA for the UE in the non-connected state becomes valid again. In some embodiments, after the step of aborting the SDT, the method further comprises: communicating with the network node to transition into a connected state; and transmitting, to the network node, the part of the SDT which is not transmitted yet in the connected state. In some embodiments, the SDT comprises at least one of: one or more repetitions of a transport block (TB); and one or more transmissions on slots for a multi-slot TB transmission.

According to a third aspect of the present disclosure, a user equipment (UE) is provided. The UE comprises: a processor; a memory storing instructions which, when executed by the processor, cause the processor to perform any of the methods of the first or second aspects.

According to a fourth aspect of the present disclosure, a method at a network node for managing time alignment (TA) related configuration for a user equipment (UE) is provided. The method comprises: determining one or more TA related configurations for the UE at least partially based on at least one of one or more beams in which the UE are able to be camped, one or more reference signals which are able to be detected by the UE, and one or more configured grant (CG) configurations which are configured at the UE; and transmitting, to the UE, the determined one or more TA related configurations.

In some embodiments, the one or more TA related configurations are related to small data transmission (SDT) at the UE in a non-connected state. In some embodiments, each of the TA related configurations comprises one or more criteria for checking validity of the TA at the UE. In some embodiments, the one or more criteria comprises at least one of: a TA timer; a Reference Signal Received Power (RSRP) related configuration; a Reference Signal Received Quality (RSRQ) related configuration; a Signal to Interference plus Noise Ratio (SINR) related configuration; a Synchronous Signal Block (SSB) or Channel State Information Reference Signal (CSI-RS) related configuration; and a UE position related configuration. In some embodiments, the one or more TA related configurations are received via one or more messages transmitted by the network node, wherein the one or more messages comprise at least one of: a broadcasted Radio Resource Control (RRC) message; an RRC message dedicated for the UE only; a Medium Access Control (MAC) Protocol Data Unit (PDU) message; and a Downlink Control Information (DCI) message. In some embodiments, the RRC message dedicated for the UE only is an RRC release message which triggers the UE to transition into the RRC INACTIVE state or the RRC IDLE state. In some embodiments, each of the beams is a beam in which a Synchronous Signal Block (SSB), a Channel State Information-Reference Signal (CSI-RS), a Positioning Reference Signal (PRS), or a Demodulation Reference Signal (DMRS) is transmitted by the network node.

In some embodiments, the step of transmitting, to the UE, one or more TA related configurations comprises: transmitting, to the UE, a first TA related configuration which is associated with a first set of beams comprising a beam in which the UE is currently camped and/or which is associated with a first set of reference signals comprising the reference signal which is currently detected by the UE. In some embodiments, the first set of beams comprises all beams from the network node and/or the first set of reference signals comprises all reference signals from the network node. In some embodiments, all beams from the network node comprise one or more second sets of beams which are different from the first set of beams and/or all reference signals from the network node comprise one or more second sets of reference signals which are different from the first set of reference signals. In some embodiments, the step of transmitting, to the UE, a first TA related configuration comprises: transmitting, to the UE, the first TA related configuration and one or more second TA related configurations, which are associated with the one or more second sets of beams and/or the one or more second sets of reference signals, respectively. In some embodiments, the first TA related configuration has a value which is set independently from those of the one or more second TA related configurations.

In some embodiments, the association between the sets of beams and/or the sets of reference signals and the TA related configurations is signaled by the network node via an RRC message. In some embodiments, the values of the TA related configurations are determined as follows: setting a greater value of a TA timer in a TA related configuration than that of another TA related configuration in response to determining a beam associated with the TA related configuration has a narrower beam width than that associated with the other TA related configuration. In some embodiments, for each beam and/or reference signal, there are one or more RSRP related thresholds which are set independently from those for other beams and/or reference signals.

In some embodiments, the step of transmitting, to the UE, one or more TA related configurations comprises: transmitting, to the UE, a first TA related configuration used for a first configured grant (CG) configuration which is currently applied at the UE. In some embodiments, the first TA related configuration is used for all CG configurations configured at the UE comprising the first CG configuration. In some embodiments, there are one or more second CG configurations configured at the UE which are different from the first CG configuration, wherein the step of transmitting, to the UE, a first TA related configuration comprises: transmitting, to the UE, the first TA related configuration and one or more third TA related configurations, which are used for the one or more second CG configurations, respectively. In some embodiments, the first TA related configuration has a value which is set independently from those of the one or more third TA related configurations. In some embodiments, the association between the CG configurations and the TA related configurations is signaled by the network node via an RRC message. In some embodiments, for each CG configuration, there are one or more RSRP related thresholds which are set independently from those for other CG configurations.

According to a fifth aspect of the present disclosure, a network node is provided. The network node comprises: a processor; a memory storing instructions which, when executed by the processor, cause the processor to perform any of the methods of the fourth aspect.

According to a sixth aspect of the present disclosure, a computer program comprising instructions which, when executed by at least one processor, cause the at least one processor to carry out any of the methods of the first, second, or fourth aspects.

According to a seventh aspect of the present disclosure, a carrier containing the computer program of the sixth aspect is provided. The carrier is one of an electronic signal, optical signal, radio signal, or computer readable storage medium.

According to an eighth aspect of the present disclosure, a telecommunications system is provided. The telecommunications system comprises: one or more UEs of the third aspect; and at least one network node of the fifth aspect.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

FIG. 4 is a diagram illustrating an exemplary configured grant (CG)-based SDT procedure according to an embodiment of the present disclosure.

FIG. 5 is a flow chart illustrating an exemplary method at a UE for managing a TA related configuration according to an embodiment of the present disclosure.

FIG. 6 is a flow chart illustrating an exemplary method at a UE for SDT in a non-connected state according to an embodiment of the present disclosure.

FIG. 7 is a flow chart illustrating an exemplary method at a network node for managing a TA related configuration according to an embodiment of the present disclosure.

DETAILED DESCRIPTION

Figure 1:
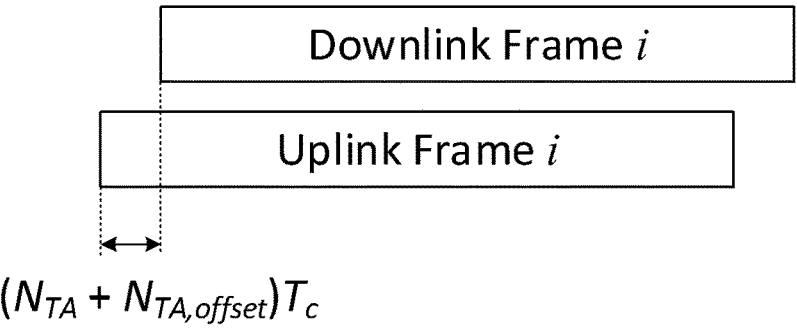
FIG. 1 is a diagram illustrating exemplary time alignment between a UE and a gNB according to an embodiment of the present disclosure.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", "fourth," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect (s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5G New Radio (NR), the present disclosure is not limited thereto. In fact, as long as TA configuration management and/or data transmission in a non-connected state is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 4th Generation Long Term Evolution (LTE), LTE-Advance (LTE-A), or 5th Generation New Radio (5G NR), etc. Therefore, one skilled in the arts could readily understand that the terms used herein may also refer to their equivalents in any other infrastructure. For example, the term "User Equipment" or "UE" used herein may refer to a terminal device, a mobile device, a mobile terminal, a mobile station, a user device, a user terminal, a wireless device, a wireless terminal, or any other equivalents. For another example, the term "gNB" used herein may refer to a network node, a base station, a base transceiver station, an access point, a hot spot, a NodeB, an Evolved NodeB, a network element, or any other equivalents. Further, please note that the term "field" used herein may refer to an attribute, a setting, a configuration, a profile, an identifier, an indicator, one or more bits/octets, or any data by which information of interest may be indicated directly or indirectly.

Further, the term "TA" used herein refers to "Time Alignment" or "Timing Advance", which can be used interchangeably, unless otherwise indicated. Further, the term "TAT" used herein refers to "Time Alignment Timer", and the term "TAG" used herein refers to "Timing Advance Group" unless otherwise indicated.

Further, following 3GPP documents are incorporated herein by reference in their entireties:

3GPP TS 38.321 V16.2.1 (2020-09), 3rd Generation Partnership Project; Technical Specification Group Radio Access Network; NR; Medium Access Control (MAC) protocol specification (Release 16); and 3GPP TS 38.331 V16.2.0 (2020-09), 3rd Generation Partnership Project; Technical Specification Group Radio Access Network; NR; Radio Resource Control (RRC) protocol specification (Release 16).

In wireless cellular systems, such as a 5G NR Radio Access Network (RAN), it is required to adjust timing of an uplink frame in order to have alignment with its corresponding downlink frame in time scale. Uplink frames are transmitted by a UE towards its serving gNB whereas downlink frames are transmitted by the gNB towards the UE. The timing control or timing advance procedure may be initiated by MAC layer and conveyed to the physical (PHY) layer for time adjustment and finally for time alignment.

In the RRC_CONNECTED state, the gNB is responsible for maintaining the timing advance to keep the L1 synchronized. Serving cells having UL to which the same timing advance applies and using the same timing reference cell are grouped in a TAG. Each TAG may contain at least one serving cell with configured uplink, and the mapping of each serving cell to a TAG is configured by RRC.

For the primary TAG the UE may use the PCell as timing reference, except with shared spectrum channel access where an SCell can also be used in certain cases. In a secondary TAG, the UE may use any of the activated SCells of this TAG as a timing reference cell, but should not change it unless necessary.

Timing advance updates may be signaled by the gNB to the UE via MAC Control Element (CE) commands. Such commands may restart a TAG-specific timer (e.g. TAT) which indicates whether the L1 can be synchronized or not: when the timer is running, the L1 is considered synchronized, otherwise, the L1 is considered non-synchronized (in which case uplink transmission can only take place on PRACH).

The TA timer may be configured in TAG-Config IE in the IE MAC-CellGroupConfig which is used to configure MAC parameters for a cell group, including DRX.

```
-- ASN1START
-- TAG-TAG-CONFIG-START
TAG-Config ::=          SEQUENCE {
   tag-ToReleaseList       SEQUENCE (SIZE (1..maxNrofTAGs)) OF TAG-Id
OPTIONAL,  -- Need N
   tag-ToAddModList        SEQUENCE (SIZE (1..maxNrofTAGs)) OF TAG
OPTIONAL   -- Need N
}
TAG ::=                 SEQUENCE {
   tag-Id                  TAG-Id,
   timeAlignmentTimer      TimeAlignmentTimer,
   ...
}
TimeAlignmentTimer ::=  ENUMERATED {ms500, ms750, ms1280, ms1920, ms2560, ms5120,
```

-continued ms10240, infinity}
-- TAG-TAG-CONFIG-STOP
-- ASN1STOP

| TAG field descriptions |
| --- |
| tag-Id |
| Indicates the TAG of the SpCell or an SCell. Uniquely identifies the TAG within the scope of a Cell Group (i.e. MCG or SCG). timeAlignmentTimer |
| Value in ms of the timeAlignmentTimer for TAG with ID tag-Id. |

In some embodiments, the UE may transmit a random access preamble to the gNB. The gNB may estimate transmission timing correction for the UE and convey the same to the UE using "Random Access Response (RAR)" message. This message may contain "Timing Advance Command (TAC)" used by the UE to make adjustment in the uplink transmission timing. Both of these may be RRC messages.

As shown in FIG. 1, one set of frames in the uplink and one set in the downlink may be transmitted over an RF carrier. Uplink frame number-i for transmission from the UE may start $T_{TA}=(N_{TA}+N_{TA,offset})*T_c$ before the start of the corresponding downlink frame at the UE where $N_{TA,offset}$ may depend on frequency band as mentioned in the table below. Here, $T_c=[1/(\Delta F_{max}*N_f)]$, where $\Delta F_{max}$ is subcarrier spacing and $N_f$ is Fast Fourier Transform (FFT) size. $T_c$ is known as basic time unit for 5G NR system.

In some embodiments, $T_c=0.509$ ns for $\Delta F_{max}=480$ KHz and $N_f=4096$. The table below mentions $N_{TA,offset}$ for different frequency ranges (FR1/FR2) and topologies (TDD/FDD).

| Frequency range and band of cell used for uplink transmission | $N_{TA,\ offset}$ (Unit: $T_c$) |
| --- | --- |
| FDD in FR1 | 0 |
| FR1 TDD band | 39936 or 25600 |
| FR2 | 13792 |

In some embodiments, the timing advance value "$N_{TA}$" may be derived by the UE based on the messages transmitted by the gNB. In some embodiments, the UE may figure out the timing advance value "$N_{TA}$" from two different MAC layer commands depending on situations. For the first uplink message after PRACH, the UE may apply the Timing Advance value that it extracts from an RAR (RACH Response) message. After the initial RACH process, the UE may apply the Timing Advance value that the UE extracts from Timing Advance MAC CE if it is received by the UE. That is, the UE may derive the initial $N_{TA}$ from the "Timing Advance" field in an RAR message, and/or may derive the subsequent $N_{TA}$ from the "Timing Advance Command" field in a MAC CE message. In this way, the UE may maintain its UL time alignment with the gNB and may be able to transmit its UL data correctly.

Figure 2:
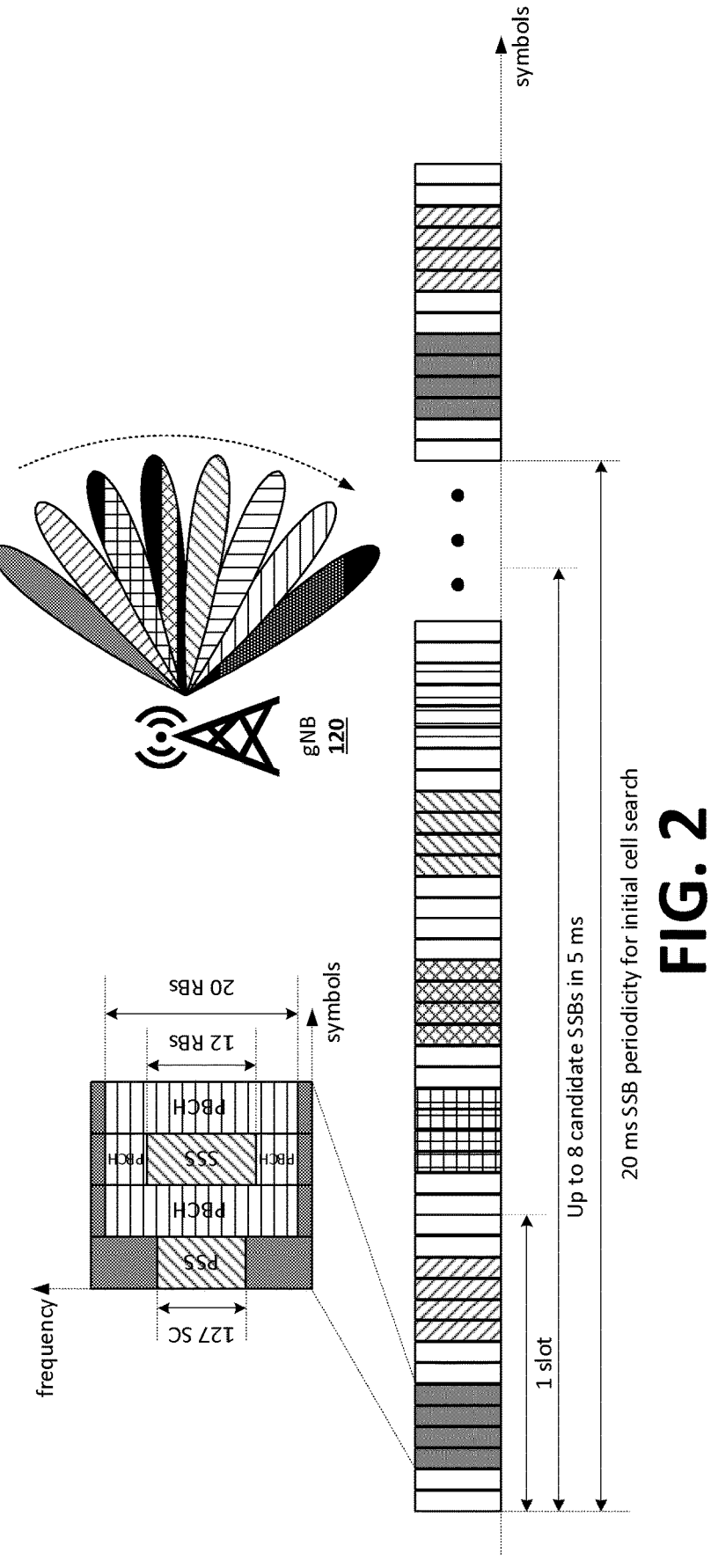
FIG. 2 is a diagram illustrating exemplary beams which may be transmitted by a gNB according to an embodiment of the present disclosure.

Further, in 5G NR, beamforming is an important feature for improving the coverage of synchronization signals (SSs) and physical broadcast channel (PBCH) block (referred to as SSB) transmission, especially for compensating the high path loss in high carrier frequency bands. To support beamforming and beam-sweeping for SSB transmission, in NR, a cell or gNB (e.g., the gNB 120 shown in FIG. 2) may transmit multiple SSBs in different narrow-beams in a time multiplexed fashion, for example, as shown in FIG. 2. The transmission of these SS/PBCH blocks may be confined to a half frame time interval (5 ms). FIG. 2 illustrates an example of SSB beam sweeping when the system is operating at frequency range 1 (FR 1).

In a 5G NR downlink frame, SS blocks or SSBs may be transmitted towards UEs at regular intervals based on periodicity set (e.g. 5/10/20/40/80/160 ms). Multiple SS blocks may be carried in a SS burst. As shown in FIG. 2, a single SS block may span 4 OFDM symbols on time axis and 240 subcarriers (or 20 resource blocks) on frequency axis. An SS block may carry PSS (Primary Synchronization Signal), SSS (Secondary Synchronization Signal) and Physical Broadcast Channel (PBCH) with Demodulation Reference Signal (DMRS). The SS blocks may be grouped into first 5 ms of the SS burst. The maximum number (L) of SS blocks in a single burst is frequency dependent. There can be about 64 blocks per burst at frequencies in frequency range 2 (i.e. mmwave frequencies in FR2). Following are the possible candidate SSB locations (L) within SS Burst set.

L=4 or L=8 for FR1

L=64 for FR2

Here DMRS associated with PBCH channel may be used to estimate RSRP (Reference Signal Received Power), which may be calculated from the received SS blocks at the UE.

As shown in FIG. 2, the gNB 120 may transmit multiple beams in different directions on which different SSBs may be carried, respectively, and a UE may detect one or more synchronous signals comprised in one or more of the SSBs to decode the data (e.g., MIB, SIB1, etc.) comprised therein. In this way, the UE may obtain any information necessary for accessing the gNB 120, for example, TA related configurations as will described below.

Figure 3:
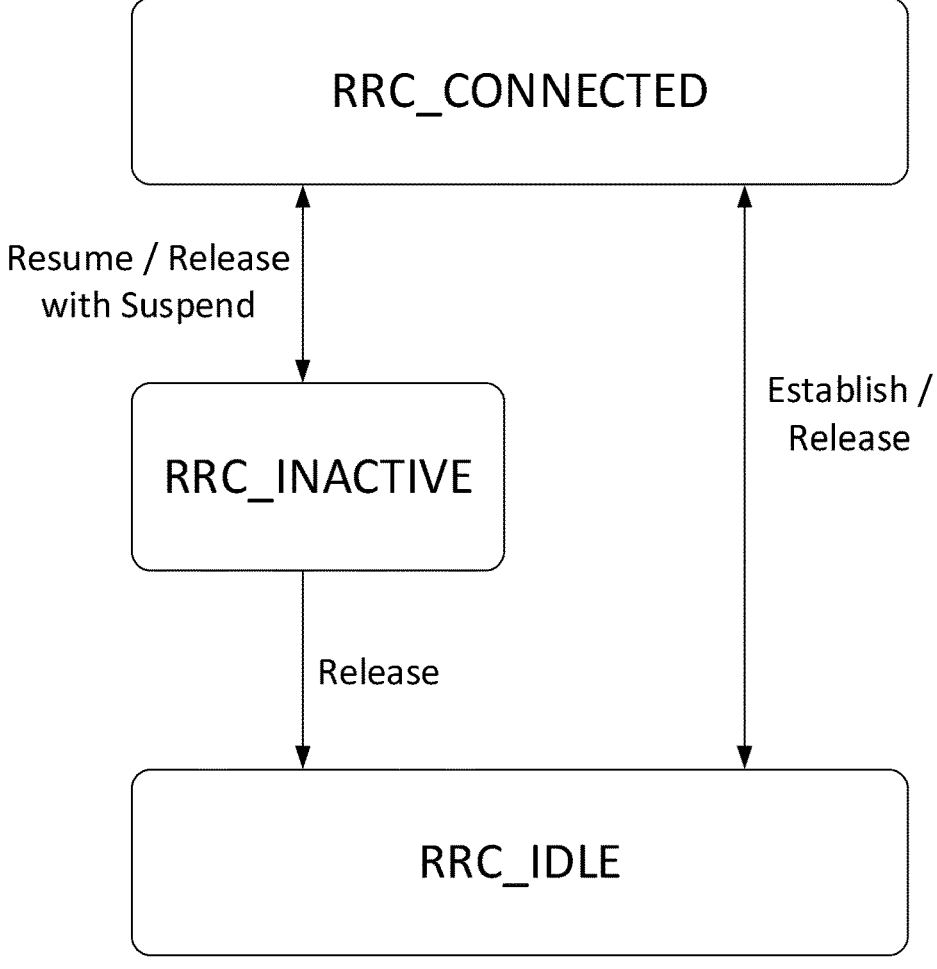
FIG. 3 is an overview diagram illustrating an exemplary UE RRC state machine and state transitions with which a UE according to an embodiment of the present disclosure is operable.

FIG. 3 is an overview diagram illustrating an exemplary UE RRC state machine and state transitions with which a UE according to an embodiment of the present disclosure is operable. As shown in FIG. 3, a UE is either in the RRC_CONNECTED state or in the RRC_INACTIVE state when an RRC connection has been established. If this is not the case, i.e., no RRC connection is established, the UE is in the RRC_IDLE state. The RRC states can further be characterized as follows:

RRC Idle:

A UE specific discontinuous reception (DRX) may be configured by upper layers;

UE controlled mobility based on network configuration;

The UE may:

monitor Short Messages transmitted with Paging-Radio Network Temporary Identifier (P-RNTI) over DCI;

monitor a Paging channel for Core Network (CN) paging using 5G-Serving-Temporary Mobile Subscriber Identity (5G-S-TMSI);

perform neighboring cell measurements and cell (re-) selection;

acquire system information and can send system information (SI) request (if configured).

perform logging of available measurements together with location and time for logged measurement configured UEs.

RRC Inactive:

A UE specific DRX may be configured by upper layers or by RRC layer;

UE controlled mobility based on network configuration;

The UE stores the UE Inactive Access Stratum (AS) context;

A RAN-based notification area is configured by RRC layer;

The UE may:

monitor Short Messages transmitted with P-RNTI over DCI;

monitor a Paging channel for CN paging using 5G-S-TMSI and RAN paging using full-RNTI;

perform neighboring cell measurements and cell (re-)selection;

perform RAN-based notification area updates periodically and when moving outside the configured RAN-based notification area;

acquire system information and can send SI request (if configured).

perform logging of available measurements together with location and time for logged measurement configured UEs.

RRC Connected:

The UE stores the AS context;

Transfer of unicast data to/from UE;

At lower layers, the UE may be configured with a UE specific DRX;

For UEs supporting carrier aggregation (CA), use of one or more secondary cells (SCells), aggregated with the special cell (SpCell), for increased bandwidth;

For UEs supporting dual connectivity (DC), use of one secondary cell group (SCG), aggregated with the master cell group (MCG), for increased bandwidth;

Network controlled mobility within NR and to/from Evolved Universal Terrestrial Radio Access (E-UTRA);

The UE may:

monitor Short Messages transmitted with P-RNTI over DCI, if configured;

monitor control channels associated with the shared data channel to determine if data is scheduled for it;

provide channel quality and feedback information;

perform neighboring cell measurements and measurement reporting;

acquire system information;

perform immediate minimization of drive tests (MDT) measurement together with available location reporting.

From above, unlike LTE, in NR there is an additional RRC state "RRC_INACTIVE" between the RRC_CONNECTED and RRC_IDLE and a UE can optionally stay in this RRC_INACTIVE state without completely releasing the RRC connection when there is no traffic and quickly switch back to the RRC_CONNECTED state when necessary.

As shown in FIG. 3, an RRC release message with a suspendConfig Information Element (IE) will move the UE from the RRC_CONNECTED state to the RRC_INACTIVE state, and an RRC resume message will take it back to the RRC_CONNECTED state. Similarly, an RRC release message without a suspendConfig or an abnormal failure will put the UE in the RRC_IDLE state. However, the present disclosure is not limited thereto. In some other embodiments, different conditions for the state transitions may be applicable.

Further, please note that although some embodiments of the present disclosure are described below with reference to the RRC_INACTIVE state, the present disclosure is not limited thereto. In some other embodiments, the inventive concept of the embodiments may also be applicable to SDT in another state, e.g., the RRC_IDLE state.

For example, in LTE Rel-16, the feature Pre-configured Uplink Resources (PUR) was introduced for LTE-M and NB-IoT. In PUR, similar to Rel-17 CG-SDT, PUSCH resources may be preconfigured periodically in RRC_IDLE state for a UE to transmit periodic reports etc. For PUR, three Timing Alignment validation criteria were introduced, which (if configured) the UE may fulfill to be allowed to transmit in the configured PUR occasions:

The UE has not changed serving cell.

pur-TimeAlignmentTimer is running as confirmed by lower layers (optionally configurable).

Since the last TA validation, the serving cell (N)RSRP has not increased by more than increase Thresh, nor decreased by more than decreaseThresh (optionally configurable).

Note that the periodicity can be up to 8 H-SFN cycles, that is 8192*10.24s=~24 hours.

PUR-PeriodicityAndOffset-NB Information Element

```
-- ASN1START
PUR-PeriodicityAndOffset-NB-r16 ::=    CHOICE {
    periodicity8                INTEGER (1..7),
    periodicity16               INTEGER (1..15),
    periodicity32               INTEGER (1..31),
    periodicity64               INTEGER (1..63),
    periodicity128              INTEGER (1..127),
    periodicity256              INTEGER (1..257),
    periodicity512              INTEGER (1..511),
    periodicity1024             INTEGER (1..1023),
    periodicity2048             INTEGER (1..2047),
    periodicity4096             INTEGER (1..4095),
    periodicity8192             INTEGER (1..8191)
}
-- ASN1STOP
```

Therefore, the pur-TimeAlignmentTimer is, unlike the legacy timer in the RRC_CONNECTED state, not directly connected to how long the network can be expected to have uplink synchronized and the current UE speed and conditions, but more of a fail-safe mechanism for the PUR configuration.

Therefore, states such as RRC_INACTIVE, RRC_IDLE may be collectively referred to as "non-connected" states and may comprise 3GPP-compliant states and/or similar states in other access technologies, such as, Wi-Fi, Bluetooth, WiMax, etc.

In NR Rel-17 SDT work item, two solutions are specified for enabling SDT in RRC_INACTIVE state: RACH-based SDT (i.e., transmitting small data on Message A PUSCH in a 2-step RACH procedure, or transmitting small data on Message 3 PUSCH in a 4-step RACH procedure) and Configured Grant (CG) based SDT (i.e., SDT over configured grant type-1 PUSCH resources for UEs in RRC inactive state).

CG PUSCH resources are the PUSCH resources configured in advance for the UE. When there is uplink data available at UE's buffer, it may immediately start uplink transmission using the pre-configured PUSCH resources without waiting for an UL grant from the gNB, thus reducing the latency. NR supports CG type 1 PUSCH transmission and CG type 2 PUSCH transmission. For both two types, the PUSCH resources (time and frequency allocation, periodicity, etc.) are preconfigured via dedicated RRC signaling. The CG type 1 PUSCH transmission is activated/deactivated by RRC signaling, while the CG type 2 PUSCH transmission is activated/deactivated by an UL grant using downlink control information (DCI) signaling.

The 4-step RACH, 2-step RACH, and UL transmission of a configured grant type have already been specified as part of Rel-15 and Rel-16. Therefore, the SDT features to be specified in NR Rel-17 can build on these building blocks to enable small data transmission in RRC_INACTIVE state for NR.

Some embodiments of the present disclosure focus on the CG based SDT scheme. The following agreements were made in RAN2 for CG based SDT scheme:

1. CG-SDT resource configuration may be provided to UEs in RRC_CONNECTED only within the RRCRelease message, i.e. no need to also include it in RRCReconfiguration message;
2. CG-PUSCH resources may be separately configured for NUL and SUL. FFS if they are allowed at the same time. This depends on the alignments CRs for Rel-16;
3. For CG-SDT, the subsequent data transmission may use the CG resource or DG (i.e. dynamic grant addressed to UE's C-RNTI). Details on C-RNTI, may be the same as the previous C-RNTI or may be configured explicitly by the network can be discussed in stage 3;
4. TAT-SDT may be started upon receiving the TAT-SDT configuration from gNB, i.e. RRCRelease message, and may be (re)started upon reception of TA command;
5. From RAN2 point of view, similar to PUR, assume that a TA validation mechanism for SDT based on RSRP change is introduced, i.e. RSRP-based threshold(s) may be configured. FFS on how to handle CG configuration when TA expires or when TA is invalid due to RSRP threshold. Details of the TA validation procedure may be further discussed.
6. UE may release CG-SDT resources when TAT expires in RRC_INACTIVE state.

FIG. 4 is a diagram illustrating an exemplary configured grant (CG)-based SDT procedure according to an embodiment of the present disclosure.

As shown in FIG. 4, the UE 110 may receive a semi-persistently assigned UL resource for SDT at step 410 when it is in the RRC_CONNECTED state. After transitioning to the RRC_INACTIVE state, the UE 110 may continue to use such UL resources for SDT. For example, the UE 110 may transmit its UL SDT data over the assigned semi-persistent radio resource to the gNB 120 in the RRC_INACTIVE state, and the gNB 120 may acknowledge the reception of the SDT data, for example, by an RRC Release message with a suspendConfig, to keep the UE 110 in the RRC_INACTIVE state.

Further, there are also RACH-based SDTs (e.g., 4-step RACH based SDT or 2-step RACH based SDT as mentioned above) which is not the focus in the present disclosure and therefore omitted for simplicity.

No matter which of the SDT procedures is used, the UE 110 may conduct its SDT procedure without transitioning to the RRC_CONNECTED state and thus avoid the signaling overhead and reduce its power consumption. Further, although FIG. 4 shows the CG-based SDT procedure, it is merely a specific implementation of a SDT procedure, and the present disclosure is not limited thereto. For example, a different SDT procedure based on a different procedure may be adopted. For another example, the UE 110 may be configured with a different UL transmission timing for SDT than that shown in FIG. 4.

Further, slot aggregation for PUSCH is supported in Rel-15 and renamed to PUSCH Repetition Type A in Rel-16. The term PUSCH repetition Type A is used even if there is only a single repetition. In Rel-15, a PUSCH transmission that overlaps with DL symbols is not transmitted.

For DCI granted multi-slot transmission (PDSCH/PUSCH) vs. semi-static DL/UL assignment If semi-static DL/UL assignment configuration of a slot has no direction confliction with scheduled PDSCH/PUSCH assigned symbols, the PDSCH/PUSCH in that slot is received/transmitted.

If semi-static DL/UL assignment configuration of a slot has direction confliction with scheduled PDSCH/PUSCH assigned symbols, the PDSCH/PUSCH transmission in that slot is not received/transmitted, i.e. the effective number of repetitions reduces.

In Rel-15, the number of repetitions is semi-statically configured by RRC parameter pusch-AggregationFactor with up to 8 repetitions supported.

A new repetition format PUSCH repetition Type B is supported in Rel-16, which allows back-to-back repetition of PUSCH transmissions. The main difference between two types of repetition is that repetition Type A only allows a single repetition in each slot, with each repetition occupying the same symbols within the slot. Using this type A repetition, when a PUSCH repetition has a number of symbols shorter than 14 symbols, it introduces gaps between repetitions, increasing the overall latency.

Another change compared to Rel-15 is how the number of repetitions is signaled. In Rel-15, the number of repetitions is semi-statically configured, while in Rel-16 the number of repetitions can be indicated dynamically. This applies to both dynamic grants and configured grants type 2.

In NR R16, invalid symbols for PUSCH repetition Type B include reserved UL resources. The invalid symbol pattern indicator field is configured in the scheduling DCI. Segmentation occurs around symbols that are indicated as DL by the semi-static TDD pattern and invalid symbols.

For PUSCH transmissions with a Type 1 or Type 2 configured grant, the number of (nominal) repetitions K to be applied to the transmitted transport block is provided by the indexed row in the time domain resource allocation table if numberOfRepetitions is present in the table; otherwise K is provided by the higher layer configured parameters repK.

In NR Rel-17, a multi-slot TB transmission is being discussed in the coverage enhancement work item. The multi-slot TB has a TB size determined based on multiple slots and the modulated symbols are mapped to multiple slots for this TB transmission.

As mentioned above, a TAT timer is agreed to be used as one of the factors to determine the validation of TA for CG based SDT transmissions. Furthermore, an RSRP change is also assumed to be used for validation of TA, similar to PUR in LTE.

However in NR, there would be multiple SSB beams supported and they will be mapped to different CG PUSCH resources. There could also be multiple CG PUSCH configurations for CG-based SDT. One TAT may be not enough since different CG PUSCH configurations may have different TA timer requirement, and different sets of SSBs may require different TA timer duration. So multiple TATs or a separate TAT for SDT compared to TAT used for RRC active UEs may be needed for CG based SDT in NR.

Another issue is that when CG PUSCH repetition is supported or when a multi-slot TB is transmitted, and if a TA is found to be invalid before the last transmission of a CG PUSCH repetition, whether the remaining repetitions should be discarded or not should be determined as well.

Some embodiments of the present disclosure may provide different methods on TA related configuration for uplink transmissions in low activity states such as RRC inactive state or idle state for CG-based SDT, comprising:

TA related configuration with respect to multiple SSBs e.g. a first TA configuration parameters (e.g. TAT1) for a first set of SSBs and a second TA configuration parameters (e.g. TAT2) for a second set of SSBs. The association between TA configuration parameters and the set of SSBs can be determined or configured by the network or it can be determined by the UE based on one or more pre-defined rules (e.g. based on RSRP of SSBs, based on beam characteristics such as beamwidth of SSBs etc.).

TA related configuration with respect to multiple CG configurations. In one example the same TA configuration (e.g. TAT) is associated with two or more CG configurations. In another example different TA configurations are associated with different CG configurations. For example a first TA configuration parameters (e.g. TAT1) for a first CG configuration and a second TA configuration parameters (e.g. TAT2) for a second CG configuration. The association between TA configurations and the CG configurations can be determined or configured by the network or it can be determined by the UE based on one or more pre-defined rules (e.g. based on number of repetitions in CG configuration etc.).

TA related configuration with respect to CG PUSCH repetitions and multi-slot TB transmission In some embodiments, the term "TA configuration" may be a determination of TA timer, or a determination of any other information for validation of a TA, e.g. the RSRP related information for checking whether the TA is valid for an uplink transmission in SDT. In some embodiments, the term "CG PUSCH resource", also known as "CG resource" or "CG configured PUSCH resource", means the time, frequency and DMRS resources configured in a configured grant for PUSCH transmissions. In some embodiments, the UE may be configured with set of beams (e.g. SSBs) and with their associated CG resources for CG based SDT. A beam may interchangeably be called as a DL RS (e.g. SSB, CSI-RS), spatial filter, spatial domain transmission filter, main lobe of the radiation pattern of antenna array etc. The beam information within the set of beams may comprise identifiers of pre-defined information e.g. beam index, beam configuration pattern or format, frequency range, such as SSB indices in FR2 for SSB format D etc. SSB index identifies SSB within SS Burst, which is also called as half frame (e.g. 5 ms).

In some embodiments, the term "RRC release message" means the message to release RRC so that UE will move from RRC connected state to RRC inactive state or RRC idle state. In some embodiments, there may be at least 2 types of rules assumed to be used determine whether a TA is valid or not, i.e. a timer (e.g. called TA-SDT timer, or TAT timer) and RSRP threshold related requirement, wherein the RSRP threshold requirement maybe an absolute RSRP threshold requirement and/or an relative RSRP threshold requirement.

TA Related Configuration with Respect to Multiple SSBs

In NR some of the SSB beams may be wider (e.g. beam width of 30 degrees), and some of the SSB beams may be narrower (e.g. beam width of 10 degrees). The beam contains Pw dB or Z % of the power compared to the total power within the beamwidth, e.g., Pw=−3 dB. The beamwidth is one of the beam characteristics.

In some embodiments, SSB beams of different beamwidths can be configured with or associated with different TAT parameters. In some embodiments, SSB beams with different ranges of beam widths may be configured with or associated with different TAT parameters. There can be 2 more ranges of beamwidths, which can be pre-defined or configured. Examples of two different ranges of beamwidths may be range X and range Y. In one example $X \leq Xh$ and $Y > Xh$; where Xh is a threshold (e.g. Xh=20 degrees). In another example X and/or Y may be bounded by certain min and max beamwidths e.g. X=[Xmin, Xmax] and Y=[Ymin, Ymax], or X=[Xmin, Xmax] and Y>Xmax. Assume X comprising smaller beamwidth range compared to that of Y. For example Xmin=5 degrees and Xmax=15 degrees, while Ymin=15 degrees and Ymax=60 degrees.

In some embodiments, for the subset of SSBs with wider beams, a shorter TAT may be used as the RSRP for this wider SSB beam may not change that much (compared to same movement in narrow SSB beams) meaning that the RSRP variation criteria may be not enough if the TAT duration is too long and there could also be a lot of UEs selecting that SSB since it's wider which requires more stringent TA requirement to avoid interference when the load is high. Otherwise if a relatively long TAT is used, the TA validation method may result in incorrect or less reliable outcome resulting in UE transmitting the SDT using an invalid TA value.

In some embodiments, for the subset of SSBs with narrower beams, a longer TAT can be allowed since the SSB beam switching happens more frequently among those narrow beams (RSRP is also easy to change which can also be able to invalidate the TA within the long duration of TAT) and there will be not that many UEs selecting those beams as they are restricted to be within the area covered by those narrow beams.

In some embodiments, the TA configuration for SDT may be associated to one or multiple SSBs. With this method, the set of SSBs associated with the TAT may be used for RSRP calculation to further determine whether a TA is valid or not even if the TAT is running.

In some embodiments, separate TATs may be configured for different subsets of SSBs. These multiple TATs may be assumed as TATs for one TAG if one TA value is assumed or multiple TAGs if multiple TA values are assumed. In some embodiments, separate TA values may be used for multiple CG PUSCH transmissions associated to different SSBs.

In some embodiments, SSBs may be divided into different SSB subsets based on the RRC configuration to associate a subset of SSBs with TA related parameters e.g. TA, TAT etc. In this case the association between the subset of SSBs and the TA parameters is configured by the network e.g. via RRC signaling. In some embodiments, the UE may be configured with 2 or more sets of TA parameters e.g. TAT1 and TAT2. The UE may also be configured with one or more signal thresholds for comparing it with RSRP (and/or RSRP change) of the SSBs e.g. RSRP (and/or RSRP change) threshold. UE may determine the SSB subset associated to one TA configuration based on one or more of the following:

The measured SS-RSRP, and a RSRP range defined for selection of SSB sets.

E.g. SSBs whose RSRP is equal to or above a certain threshold (H1) but below another threshold (H2) are associated with one set of TA related parameters (e.g. TAT1); whereas SSBs whose RSRP is above H2 are associated with another set of TA related parameters (e.g. TAT2). The UE uses the SSBs associated with the determined TA parameters for TA validation for data transmission using CG resources.

The measured SS-RSRP (and/or SS-RSRP change) for different SSBs in the

SSB subset may be combined when compared to RSRP thresholds. The combination may be one of The maximum SS-RSRP (and/or SS-RSRP change) of the SSBs in the SSB set The minimum SS-RSRP (and/or SS-RSRP change) of the SSBs in the SSB set the average or median SS-RSRP (and/or SS-RSRP change) of the SSBs in the SSB set an additional side condition may be that it is the same SSB that has maximum SS-RSRP/minimum SS-RSRP (and/or minimum/maximum SS-RSRP change) as in a previous SS-RSRP (and/or SS-RSRP change) measurement In some embodiments, different RSRP-thresholds and/or RSRP-change-thresholds may be configured per SSB. Since the SSB beams may have different configurations (e.g. being more or less narrow, different power boosting, different elevation angle, etc.), therefore different RSRP-threshold and/or RSRP-change-threshold may be beneficial to have per SSB beam, for example, to enable increaseThresh and decreaseThresh being configurable per SSB beam. Moreover, the different RSRP (and/or RSRP change) thresholds may be characterized by different resolutions, different ranges indicating the maximum or minimum RSRP changes.

TA Related Configuration with Respect to Multiple CG PUSCH Configurations

In some embodiments, one TA configuration may be configured for all CG PUSCH configurations. In some embodiments, separate CG PUSCH configurations may have different TA configurations. In one example, separate TAT and/or RSRP change threshold and/or absolute RSRP threshold may be configured for TA validation in RRC release message for CG based SDT transmission.

In some embodiments, the UE may determine the CG configuration via selecting the SSBs according to on one or more of the following:

The measured SS-RSRP, and/or RSRP range defined for selection of SSB sets.

The measured SS-RSRP and/or SS-RSRP change for different SSBs in the SSB subset may be combined when compared to RSRP thresholds. The combination may be one of The maximum SS-RSRP and/or RSRP range of the SSBs in the SSB set The minimum SS-RSRP and/or RSRP range of the SSBs in the SSB set the average or median SS-RSRP and/or RSRP range of the SSBs in the SSB set an additional side condition may be that it is the same SSB that has maximum SS-RSRP/minimum SS-RSRP and/or maximum RSRP range/minimum RSRP range as in a previous SS-RSRP measurement In some embodiments, different RSRP-thresholds or RSRP-change-thresholds may be configured per CG PUSCH configuration. Since the SSB beams may have different configurations (e.g. being more or less narrow, different power boosting, different elevation angle, etc.), therefore different RSRP-threshold and/or RSRP-change-threshold could be beneficial to have per CG PUSCH configuration, e.g., to enable increaseThresh (threshold for RSRP increased) and decreaseThresh (threshold for RSRP decreased) being configurable per CG PUSCH configuration. Moreover, the different RSRP thresholds may be characterized by different resolutions, different ranges indicating the maximum or minimum RSRP changes.

In some embodiments, depending on the beam characteristics (e.g. if they are wide or narrow beams) as described above, the UE may be allowed to check the TA validation using one or more number of TA validation criteria. In one example, if the beams are wide (e.g. beam width is greater than a certain threshold or if the number of detected or configured beams are greater than a certain threshold), then the UE may be allowed to check the TA validation only using the RSRP method and it can be allowed to skip the validation based on TAT timer.

CG PUSCH Repetitions

In some embodiments, when TA is determined as invalid (e.g. due to TAT expires or when SS-RSRP changes too much (e.g. magnitude of SS-RSRP change is above threshold) or when SS-RSRP is too low (e.g. SS-RSRP is below threshold)) during the transmission of a first set of one or more repetitions (e.g. for PUSCH), the remaining repetitions (e.g. for PUSCH) may be transmitted using one or more of the following principles/rules (pre-defined or configured):

Still transmitted using the latest TA

Not transmitted

The decision of whether to transmit or not transmit is based on one or more of the following conditions Whether TAT expires Whether a measured SS-RSRP change is larger than an RSRP change threshold Whether a measured SS-RSRP is above an RSRP threshold E.g. still transmit the remaining repetitions when the measured SS-RSRP is above a RSRP threshold, otherwise no transmissions of the remaining repetitions Whether the time gap until the remaining transmissions is larger than a threshold The remaining repetitions can be delayed, or postponed or suspended if TA become invalid during the transmission where repetitions in PUSCH is applied until the TA becomes valid again.

UE may perform the remaining or entire data using fallback procedures such as switching to CONNECTED mode and carrying out the transmissions, performs transmissions using random access.

In some embodiments, when a multiple slot transport block (TB) is transmitted over multiple slots, but the TA is determined as invalid in one the multiple slots, the transmission in the remaining slots may be determined with one or more of the methods in the above embodiment.

FIG. 5 is a flow chart of an exemplary method 500 at a user equipment (UE) for managing time alignment (TA) related configuration according to an embodiment of the present disclosure. The method 500 may be performed at a user equipment (e.g., the UE 110). The method 500 may comprise step S510, S520, and step S530. However, the present disclosure is not limited thereto. In some other embodiments, the method 500 may comprise more steps, less steps, different steps or any combination thereof. Further, the steps of the method 500 may be performed in a different order than that described herein. Further, in some embodiments, a step in the method 500 may be split into multiple sub-steps and performed by different entities, and/ or multiple steps in the method 500 may be combined into a single step.

The method 500 may begin at step S510 where one or more TA related configurations may be received from a network node.

At step S520, a TA related configuration may be determined from the received one or more TA related configurations at least partially based on at least one of a beam in which the UE is currently camped, a reference signal which is currently detected by the UE, and a configured grant (CG) configuration which is currently applied at the UE.

At step S530, the determined TA related configuration may be applied.

In some embodiments, the one or more TA related configurations may be related to small data transmission (SDT) at the UE in a non-connected state. In some embodiments, each of the TA related configurations may comprise one or more criteria for checking validity of the TA at the UE. In some embodiments, the one or more criteria may comprise at least one of: a TA timer; a Reference Signal Received Power (RSRP) related configuration; a Reference Signal Received Quality (RSRQ) related configuration; a Signal to Interference plus Noise Ratio (SINR) related configuration; a Synchronous Signal Block (SSB) or Channel State Information Reference Signal (CSI-RS) related configuration; and a UE position related configuration. In some embodiments, the one or more TA related configurations may be received via one or more messages transmitted by the network node, wherein the one or more messages may comprise at least one of: a broadcasted Radio Resource Control (RRC) message; an RRC message dedicated for the UE only; a Medium Access Control (MAC) Protocol Data Unit (PDU) message; and a Downlink Control Information (DCI) message. In some embodiments, the RRC message dedicated for the UE only may be an RRC release message which may trigger the UE to transition into the RRC INACTIVE state or the RRC IDLE state.

In some embodiments, the beam may be a beam in which a Synchronous Signal Block (SSB), a Channel State Information-Reference Signal (CSI-RS), a Positioning Reference Signal (PRS), or a Demodulation Reference Signal (DMRS) may be detected by the UE and for which the validity of TA may be checked by the UE. In some embodiments, the step S510 may comprise: receiving, from the network node, a first TA related configuration which may be associated with a first set of beams comprising the beam in which the UE may be currently camped and/or which may be associated with a first set of reference signals comprising the reference signal which may be currently detected by the UE, wherein the step of determining a TA related configuration may comprise: determining the first TA related configuration as the determined TA related configuration.

In some embodiments, the first set of beams may comprise all beams from the network node and/or the first set of reference signals may comprise all reference signals from the network node. In some embodiments, all beams from the network node may comprise one or more second sets of beams which may be different from the first set of beams and/or all reference signals from the network node may comprise one or more second sets of reference signals which may be different from the first set of reference signals. In some embodiments, the step S510 may comprise: receiving, from the network node, the first TA related configuration and one or more second TA related configurations, which may be associated with the one or more second sets of beams and/or the one or more second sets of reference signals, respectively. In some embodiments, the first TA related configuration may have a value which may be set independently from those of the one or more second TA related configurations.

In some embodiments, the association between the sets of beams and/or the sets of reference signals and the TA related configurations may be signaled by the network node via an RRC message. In some embodiments, the association between the sets of beams and/or the sets of reference signals and the TA related configurations may be determined by the UE at least partially based on one or more RSRP related thresholds in the one or more TA related configurations signaled by the network node. In some embodiments, the association may be determined as follows: associating a TA related configuration with a beam and/or a reference signal in response to determining that the beam and/or the reference signal may have a measured RSRP equal to or greater than a first RSRP threshold and less than a second RSRP threshold; and associating another TA related configuration with the beam and/or the reference signal in response to determining that the beam and/or the reference signal may have a measured RSRP equal to or greater than the second RSRP threshold. In some embodiments, the association may be determined as follows: associating a TA related configuration with a set of beams and/or a set of reference signals in response to determining that the set of beams and/or the set of reference signals may have one or more statistics values of RSRP which may meet the one or more RSRP related thresholds in the one or more TA related configurations signaled by the network node. In some embodiments, the statistics values may comprise at least one of: the maximum synchronous signal (SS)—RSRP for the set of beams and/or the set of reference signals; the minimum SS-RSRP for the set of beams and/or the set of reference signals; the average SS-RSRP for the set of beams and/or the set of reference signals; the median SS-RSRP for the set of beams and/or the set of reference signals; the maximum SS-RSRP change for the set of beams and/or the set of reference signals; the minimum SS-RSRP change for the set of beams and/or the set of reference signals; the average SS-RSRP change for the set of beams and/or the set of reference signals; the median SS-RSRP change for the set of beams and/or the set of reference signals; and whether a same beam has the maximum and/or minimum SS-RSRP and/or SS-RSRP change in a current SS-RSRP measurement as in a previous SS-RSRP measurement. In some embodiments, for each beam and/or reference signal, there may be one or more RSRP related thresholds which may be set independently from those for other beams and/or reference signals.

In some embodiments, the step S510 may comprise: receiving, from the network node, a first TA related configuration used for a first configured grant (CG) configuration which is currently applied at the UE, wherein the step S520 comprises: determining the first TA related configuration as the determined TA related configuration. In some embodiments, the first TA related configuration may be used for all CG configurations configured at the UE comprising the first CG configuration. In some embodiments, there may be one or more second CG configurations configured at the UE which may be different from the first CG configuration, wherein the step S510 may comprise: receiving, from the network node, the first TA related configuration and one or more third TA related configurations, which may be used for the one or more second CG configurations, respectively. In some embodiments, the first TA related configuration may have a value which may be set independently from those of the one or more third TA related configurations. In some embodiments, the association between the CG configurations and the TA related configurations may be signaled by the network node via an RRC message. In some embodiments, the association between the CG configurations and the TA related configurations may be determined by the UE at least partially based on one or more RSRP related thresholds in the one or more TA related configurations signaled by the network node. In some embodiments, the association may be determined as follows: associating a TA related configuration with a CG configuration in response to determining that a beam and/or a reference signal associated with the CG configuration has an RSRP equal to or greater than a first RSRP threshold and less than a third RSRP threshold; and associating another TA related configuration with the CG configuration in response to determining that the beam and/or the reference signal associated with the CG configuration may have an RSRP equal to or greater than the third RSRP threshold.

In some embodiments, the association may be determined as follows: associating a TA related configuration with a CG configuration in response to determining that a set of beams and/or a set of reference signals associated with the CG configuration has one or more statistics values of RSRP which meet one or more RSRP related thresholds in the one or more TA related configurations signaled by the network node. In some embodiments, the statistics values may comprise at least one of: the maximum SS-RSRP for the set of beams and/or the set of reference signals; the minimum SS-RSRP for the set of beams and/or the set of reference signals; the average SS-RSRP for the set of beams and/or the set of reference signals; the median SS-RSRP for the set of beams and/or the set of reference signals; the maximum SS-RSRP range for the set of beams and/or the set of reference signals; the minimum SS-RSRP range for the set of beams and/or the set of reference signals; the average SS-RSRP range for the set of beams and/or the set of reference signals; the median SS-RSRP range for the set of beams and/or the set of reference signals; and whether a same beam and/or a reference signal has the maximum and/or minimum SS-RSRP and/or SS-RSRP change in a current SS-RSRP measurement as in a previous SS-RSRP measurement.

In some embodiments, there may be one or more RSRP related thresholds for each CG configuration which are set independently from those for other CG configurations. In some embodiments, before the step of applying the determined TA related configuration, the method 500 may further comprise: determining whether one or more criteria with regard to beam and/or reference signal are met or not, wherein the step of applying the determined TA related configuration comprises: selectively applying one or more parameters of the determined TA related configuration based on the determination of whether the one or more criteria with regard to beam and/or reference signal are met or not.

In some embodiments, the one or more criteria with regard to beam may comprise at least one of: whether the beam has a beam width greater than a threshold; and whether the number of detected or configured beams at the UE is greater than a threshold. In some embodiments, the one or more parameters may comprise RSRP related parameters. In some embodiments, the one or more parameters may comprise no parameter for TA timer.

FIG. 6 is a flow chart of an exemplary method 600 at a user equipment (UE) for SDT in a non-connected state according to an embodiment of the present disclosure. The method 600 may be performed at a user equipment (e.g., the UE 110). The method 600 may comprise step S610, S620, and step S630. However, the present disclosure is not limited thereto. In some other embodiments, the method 600 may comprise more steps, less steps, different steps or any combination thereof. Further the steps of the method 600 may be performed in a different order than that described herein. Further, in some embodiments, a step in the method 600 may be split into multiple sub-steps and performed by different entities, and/or multiple steps in the method 600 may be combined into a single step.

The method 600 may begin at step S610 where it may be determined, during the SDT, that time alignment (TA) for the UE in the non-connected state becomes invalid.

At step S620, it may be determined whether a part of the SDT which is not transmitted yet is to be transmitted or not at least partially based on a TA configuration configured at the UE.

At step S630 depending on the determination of whether a part of the SDT which is not transmitted yet is to be transmitted or not, the part of the SDT may be transmitted or the SDT may be aborted.

In some embodiments, the step S620 may comprise: determining whether a part of the SDT which is not transmitted yet is to be transmitted or not based on one or more criteria comprising at least one of: whether a TA timer in the TA configuration is expired or not; whether a measured SS-RSRP change is greater than an RSRP change threshold in the TA configuration or not; and whether a time gap until the remaining transmissions is greater than a threshold in the TA configuration or not. In some embodiments, the step S630 may comprise: transmitting the part of the SDT in response to determining that the measured SS-RSRP is greater than the RSRP threshold in the TA configuration; or aborting the SDT in response to determining that the measured SS-RSRP is equal to or less than the RSRP threshold in the TA configuration.

In some embodiments, after the step of aborting the SDT, the method 600 may further comprise: resuming the SDT in response to determining that the TA for the UE in the non-connected state becomes valid again. In some embodiments, after the step of aborting the SDT, the method 600 may further comprise: communicating with the network node to transition into a connected state; and transmitting, to the network node, the part of the SDT which is not transmitted yet in the connected state. In some embodiments, the SDT may comprise at least one of: one or more repetitions of a transport block (TB); and one or more transmissions on slots for a multi-slot TB transmission.

FIG. 7 is a flow chart of an exemplary method 700 at a network node for managing time alignment (TA) related configuration for a user equipment (UE) according to an embodiment of the present disclosure. The method 700 may be performed at a network node (e.g., the gNB 120). The method 700 may comprise step S710 and step S720. However, the present disclosure is not limited thereto. In some other embodiments, the method 700 may comprise more steps, less steps, different steps or any combination thereof. Further the steps of the method 700 may be performed in a different order than that described herein. Further, in some embodiments, a step in the method 700 may be split into multiple sub-steps and performed by different entities, and/or multiple steps in the method 700 may be combined into a single step.

The method 700 may begin at step S710 where one or more TA related configurations for the UE may be determined at least partially based on at least one of one or more beams in which the UE are able to be camped, one or more reference signals which are able to be detected by the UE, and one or more configured grant (CG) configurations which are configured at the UE.

At step S720, the determined one or more TA related configurations may be transmitted to the UE.

In some embodiments, the one or more TA related configurations may be related to small data transmission (SDT) at the UE in a non-connected state. In some embodiments, each of the TA related configurations may comprise one or more criteria for checking validity of the TA at the UE. In some embodiments, the one or more criteria may comprise at least one of: a TA timer; a Reference Signal Received Power (RSRP) related configuration; a Reference Signal Received Quality (RSRQ) related configuration; a Signal to Interference plus Noise Ratio (SINR) related configuration; a Synchronous Signal Block (SSB) or Channel State Information Reference Signal (CSI-RS) related configuration; and a UE position related configuration. In some embodiments, the one or more TA related configurations may be received via one or more messages transmitted by the network node, wherein the one or more messages may comprise at least one of: a broadcasted Radio Resource Control (RRC) message; an RRC message dedicated for the UE only; a Medium Access Control (MAC) Protocol Data Unit (PDU) message; and a Downlink Control Information (DCI) message. In some embodiments, the RRC message dedicated for the UE only may be an RRC release message which triggers the UE to transition into the RRC INACTIVE state or the RRC IDLE state. In some embodiments, each of the beams may be a beam in which a Synchronous Signal Block (SSB), a Channel State Information-Reference Signal (CSI-RS), a Positioning Reference Signal (PRS), or a Demodulation Reference Signal (DMRS) is transmitted by the network node.

In some embodiments, the step S720 may comprise: transmitting, to the UE, a first TA related configuration which is associated with a first set of beams comprising a beam in which the UE is currently camped and/or which is associated with a first set of reference signals comprising the reference signal which is currently detected by the UE. In some embodiments, the first set of beams may comprise all beams from the network node and/or the first set of reference signals comprises all reference signals from the network node. In some embodiments, all beams from the network node may comprise one or more second sets of beams which are different from the first set of beams and/or all reference signals from the network node comprise one or more second sets of reference signals which are different from the first set of reference signals. In some embodiments, the step S720 may comprise: transmitting, to the UE, the first TA related configuration and one or more second TA related configurations, which are associated with the one or more second sets of beams and/or the one or more second sets of reference signals, respectively. In some embodiments, the first TA related configuration may have a value which is set independently from those of the one or more second TA related configurations.

In some embodiments, the association between the sets of beams and/or the sets of reference signals and the TA related configurations may be signaled by the network node via an RRC message. In some embodiments, the values of the TA related configurations may be determined as follows: setting a greater value of a TA timer in a TA related configuration than that of another TA related configuration in response to determining a beam associated with the TA related configuration has a narrower beam width than that associated with the other TA related configuration. In some embodiments, for each beam and/or reference signal, there may be one or more RSRP related thresholds which are set independently from those for other beams and/or reference signals.

In some embodiments, the step S720 may comprise: transmitting, to the UE, a first TA related configuration used for a first configured grant (CG) configuration which is currently applied at the UE. In some embodiments, the first TA related configuration may be used for all CG configurations configured at the UE comprising the first CG configuration. In some embodiments, there may be one or more second CG configurations configured at the UE which are different from the first CG configuration, wherein the step S720 may comprise: transmitting, to the UE, the first TA related configuration and one or more third TA related configurations, which are used for the one or more second CG configurations, respectively. In some embodiments, the first TA related configuration may have a value which is set independently from those of the one or more third TA related configurations. In some embodiments, the association between the CG configurations and the TA related configurations may be signaled by the network node via an RRC message. In some embodiments, for each CG configuration, there may be one or more RSRP related thresholds which are set independently from those for other CG configurations.

Some embodiments of the present disclosure provide different methods on time alignment related configurations for uplink transmissions in RRC inactive state for CG-based SDT. The methods may enable robust TA validation and more accurate TA application when proper TA configurations are configured, in order to support multi-beam operation for CG-based SDT and robust CG PUSCH transmissions.

Figure 8:
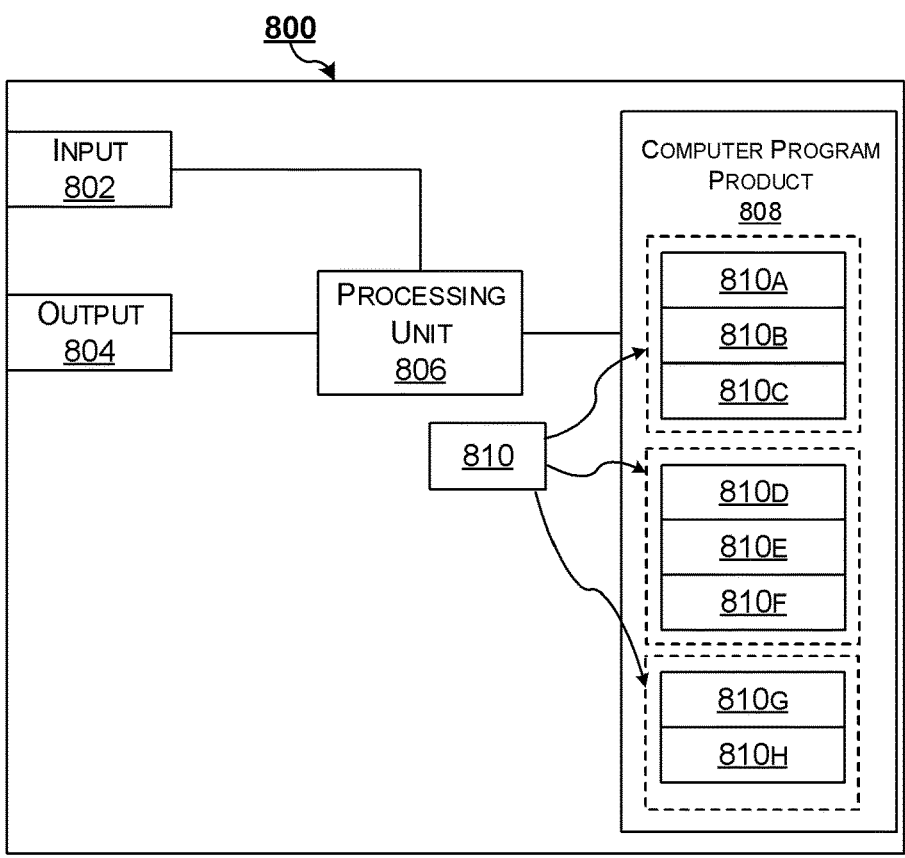
FIG. 8 schematically shows an embodiment of an arrangement which may be used in a UE or a network node according to an embodiment of the present disclosure.

FIG. 8 schematically shows an embodiment of an arrangement 800 which may be used in a user equipment (e.g., the UE 110) or a network node (e.g., the gNB 120) according to an embodiment of the present disclosure. Comprised in the arrangement 800 are a processing unit 806, e.g., with a Digital Signal Processor (DSP) or a Central Processing Unit (CPU). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit 802 and the output unit 804 may be arranged as an integrated entity or as separate entities.

Furthermore, the arrangement 800 may comprise at least one computer program product 808 in the form of a non-volatile or volatile memory, e.g., an Electrically Erasable Programmable Read-Only Memory (EEPROM), a flash memory and/or a hard drive. The computer program product 808 comprises a computer program 810, which comprises code/computer readable instructions, which when executed by the processing unit 806 in the arrangement 800 causes the arrangement 800 and/or the UE/network node in which it is comprised to perform the actions, e.g., of the procedure described earlier in conjunction with FIG. 5 to FIG. 7 or any other variant.

The computer program 810 may be configured as a computer program code structured in computer program modules 810A, 810B, and 810C. Hence, in an exemplifying embodiment when the arrangement 800 is used in a UE, the code in the computer program of the arrangement 800 includes: a module 810A for receiving, from a network node, one or more TA related configurations; a module 810B for determining a TA related configuration from the received one or more TA related configurations at least partially based on at least one of a beam in which the UE is currently camped, a reference signal which is currently detected by the UE, and a configured grant (CG) configuration which is currently applied at the UE; and a module 810C for applying the determined TA related configuration.

Further, the computer program 810 may be further configured as a computer program code structured in computer program modules 810D, 810E, and 810F. Hence, in an exemplifying embodiment when the arrangement 800 is used in a UE, the code in the computer program of the arrangement 800 includes: a module 810D for determining, during the SDT, that time alignment (TA) for the UE in the non-connected state becomes invalid; a module 810E for determining whether a part of the SDT which is not transmitted yet is to be transmitted or not at least partially based on a TA configuration configured at the UE; and a module 810F for transmitting the part of the SDT or aborting the SDT depending on the determination of whether a part of the SDT which is not transmitted yet is to be transmitted or not.

Further, the computer program 810 may be further configured as a computer program code structured in computer program modules 810G and 810H. Hence, in an exemplifying embodiment when the arrangement 800 is used in a network node, the code in the computer program of the arrangement 800 includes: a module 810G for determining one or more TA related configurations for the UE at least partially based on at least one of one or more beams in which the UE are able to be camped, one or more reference signals which are able to be detected by the UE, and one or more configured grant (CG) configurations which are configured at the UE; and a module 810H for transmitting, to the UE, the determined one or more TA related configurations.

The computer program modules could essentially perform the actions of the flow illustrated in FIG. 5 to FIG. 7, to emulate the UE or the network node. In other words, when the different computer program modules are executed in the processing unit 806, they may correspond to different modules in the UE or the network node.

Although the code means in the embodiments disclosed above in conjunction with FIG. 8 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

Figure 9:
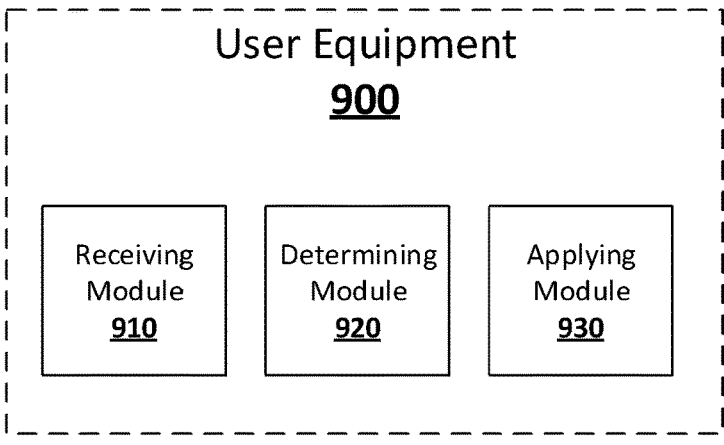
FIG. 9 is a block diagram of an exemplary UE according to an embodiment of the present disclosure.

Correspondingly to the method 500 as described above, an exemplary user equipment is provided. FIG. 9 is a block diagram of a UE 900 according to an embodiment of the present disclosure. The UE 900 may be, e.g., the UE 110 in some embodiments.

The UE 900 may be configured to perform the method 500 as described above in connection with FIG. 5. As shown in FIG. 9, the UE 900 may comprise a receiving module 910 for receiving, from a network node, one or more TA related configurations; a determining module 920 for determining a TA related configuration from the received one or more TA related configurations at least partially based on at least one of a beam in which the UE is currently camped, a reference signal which is currently detected by the UE, and a configured grant (CG) configuration which is currently applied at the UE; and an applying module 930 for applying the determined TA related configuration.

The above modules 910, 920, and/or 930 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 5. Further, the UE 900 may comprise one or more further modules, each of which may perform any of the steps of the method 500 described with reference to FIG. 5.

Figure 10:
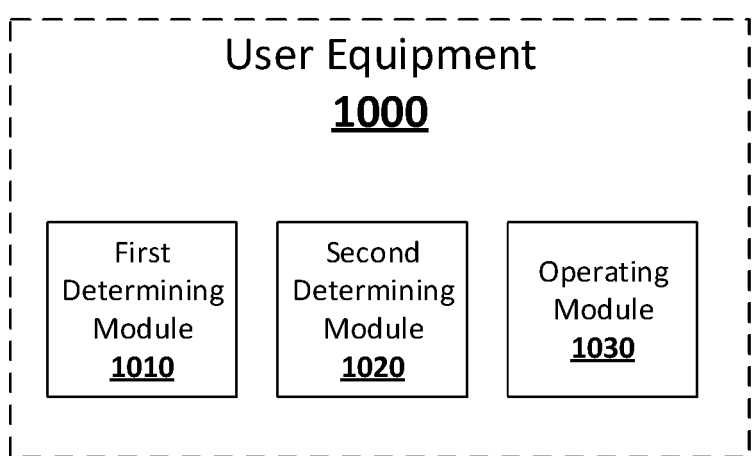
FIG. 10 is a block diagram of an exemplary UE according to another embodiment of the present disclosure.

Correspondingly to the method 600 as described above, an exemplary user equipment is provided. FIG. 10 is a block diagram of a UE 1000 according to an embodiment of the present disclosure. The UE 1000 may be, e.g., the UE 110 in some embodiments.

The UE 1000 may be configured to perform the method 600 as described above in connection with FIG. 6. As shown in FIG. 10, the UE 1000 may comprise a first determining module 1010 for determining, during the SDT, that time alignment (TA) for the UE in the non-connected state becomes invalid; a second determining module 1020 for determining whether a part of the SDT which is not transmitted yet is to be transmitted or not at least partially based on a TA configuration configured at the UE; and an operating module 1030 for transmitting the part of the SDT or aborting the SDT depending on the determination of whether a part of the SDT which is not transmitted yet is to be transmitted or not.

The above modules 1010, 1020, and/or 1030 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 6. Further, the UE 1000 may comprise one or more further modules, each of which may perform any of the steps of the method 600 described with reference to FIG. 6.

Figure 11:
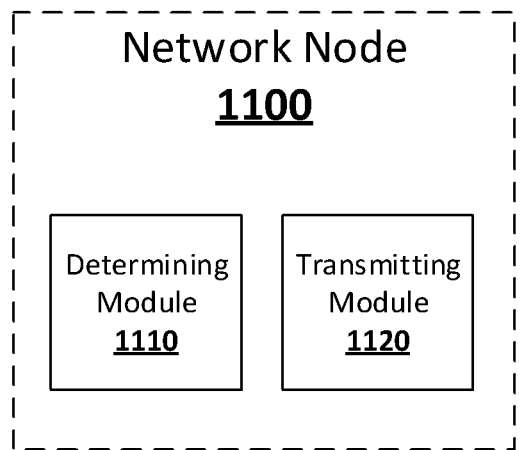
FIG. 11 is a block diagram of an exemplary network node according to an embodiment of the present disclosure.

Correspondingly to the method 700 as described above, a network node is provided. FIG. 11 is a block diagram of an exemplary network node 1100 according to an embodiment of the present disclosure. The network node 1100 may be, e.g., the gNB 120 in some embodiments.

The network node 1100 may be configured to perform the method 700 as described above in connection with FIG. 7. As shown in FIG. 11, the network node 1100 may comprise a determining module 1110 for determining one or more TA related configurations for the UE at least partially based on at least one of one or more beams in which the UE are able to be camped, one or more reference signals which are able to be detected by the UE, and one or more configured grant (CG) configurations which are configured at the UE; and a transmitting module 1120 for transmitting, to the UE, the determined one or more TA related configurations.

The above modules 1110 and/or 1120 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 7. Further, the network node 1100 may comprise one or more further modules, each of which may perform any of the steps of the method 700 described with reference to FIG. 7.

Figure 12:
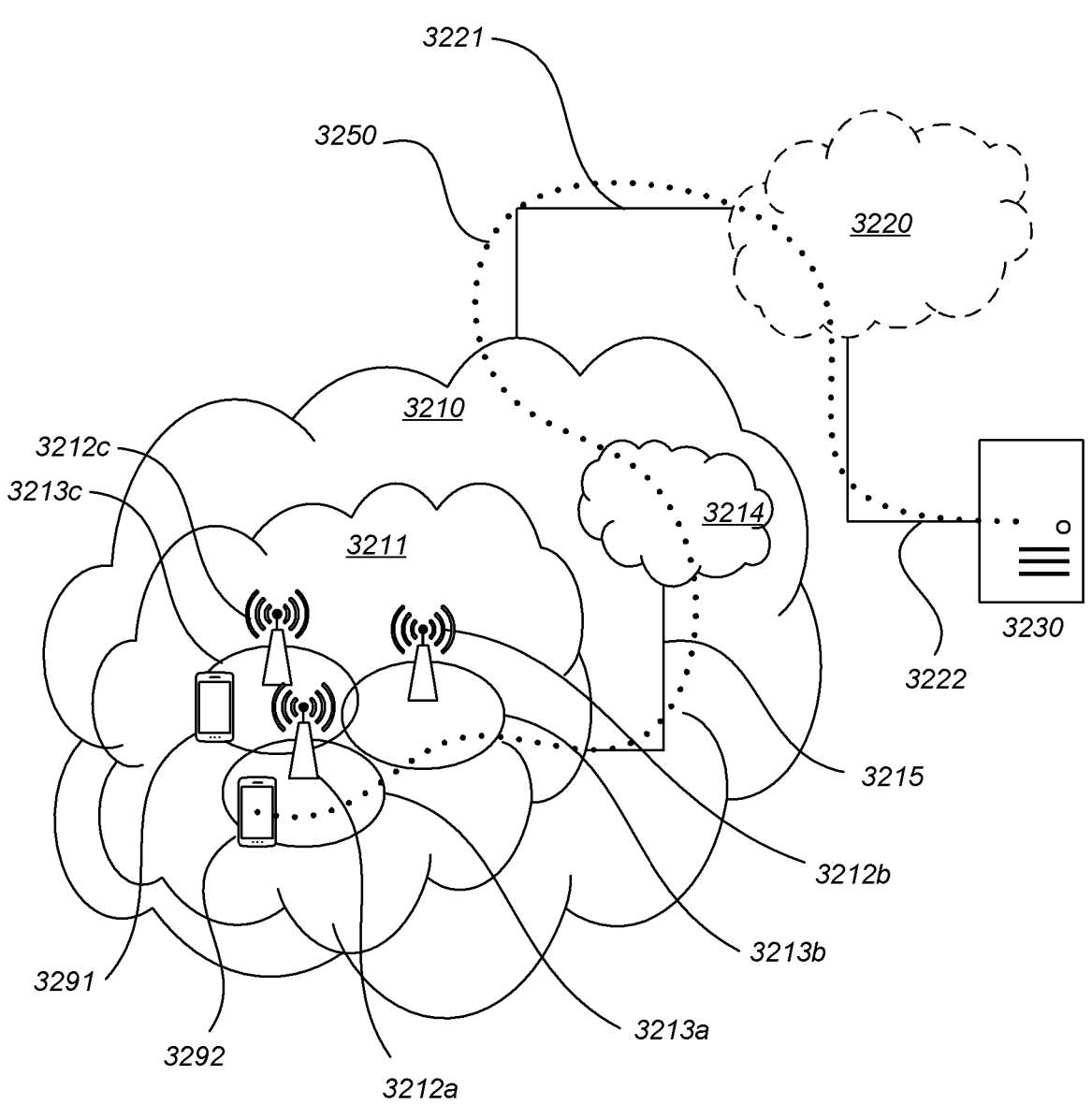
FIG. 12 schematically illustrates a telecommunication network connected via an intermediate network to a host computer according to an embodiment of the present disclosure.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
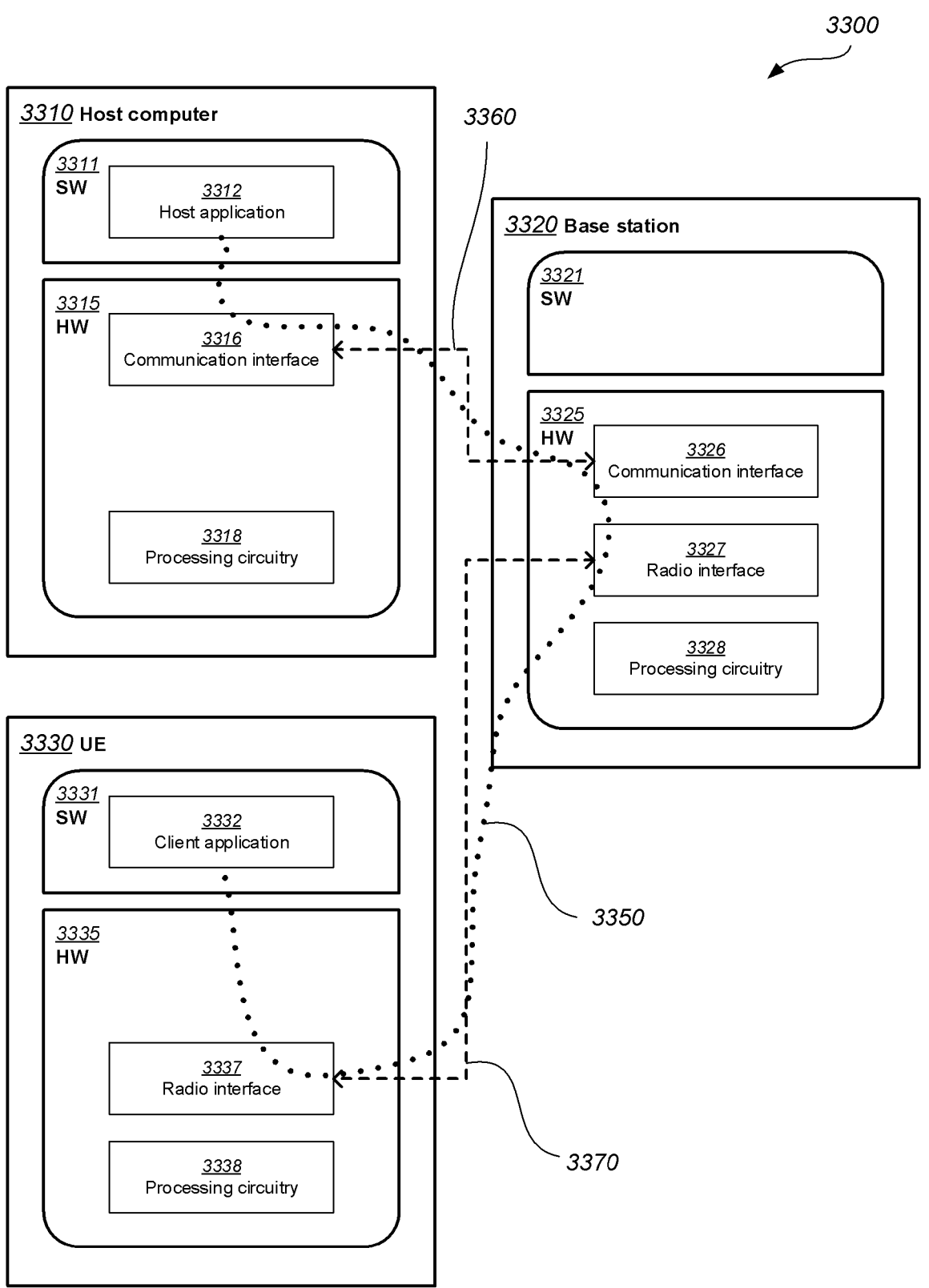
FIG. 13 is a generalized block diagram of a host computer communicating via a base station with a user equipment over a partially wireless connection according to an embodiment of the present disclosure.

It is noted that the host computer 3310, base station 3320 and UE 3330 illustrated in FIG. 13 may be identical to the host computer 3230, one of the base stations 3212*a*, 3212*b*, 3212*c* and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure One or more of the various embodiments improve the performance of OTT services provided to the UE 3330 using the OTT connection 3350, in which the wireless connection 3370 forms the last segment. More precisely, the teachings of these embodiments may improve the latency and power consumption and thereby provide benefits such as reduced user waiting time, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 14:
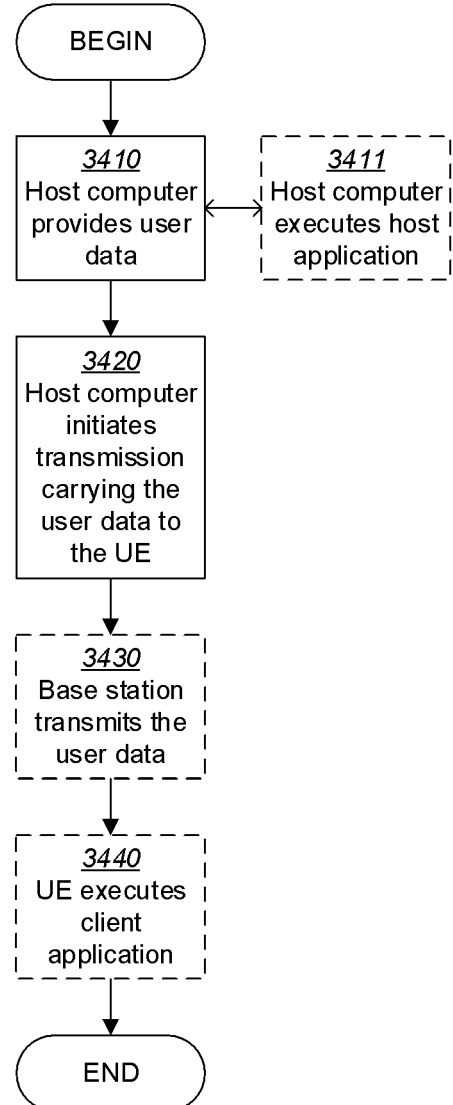
FIG. 14 to FIG. 17 are flowcharts illustrating methods implemented in a communication system including a host computer, a base station and a user equipment according to an embodiment of the present disclosure.

FIG. 14 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 15:
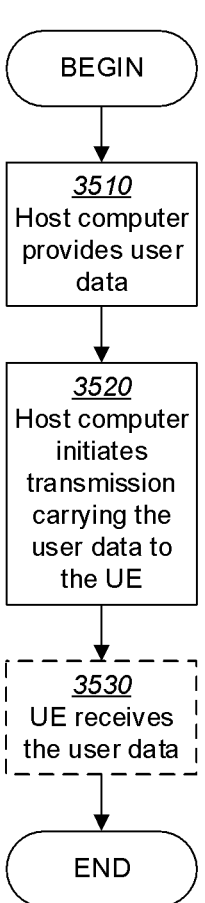

FIG. 15 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 16:
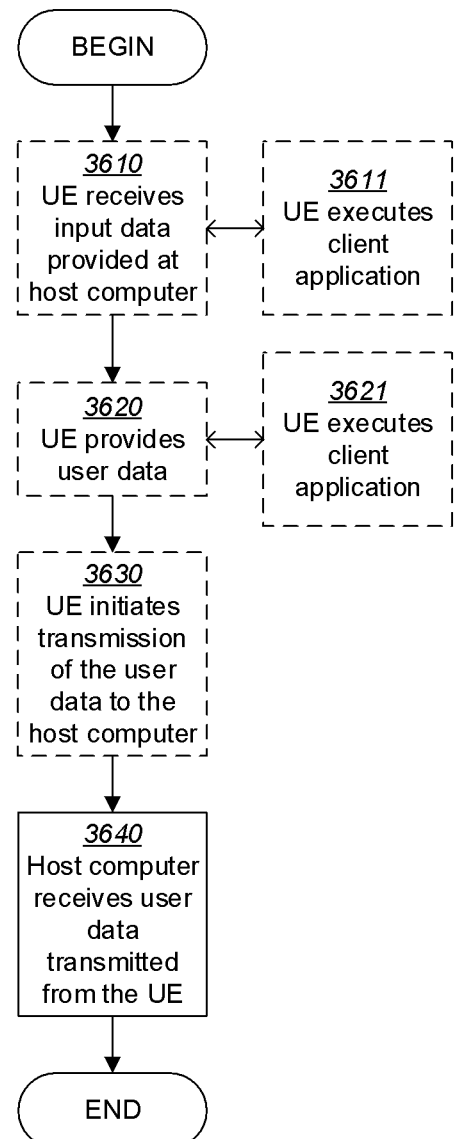

FIG. 16 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 17:
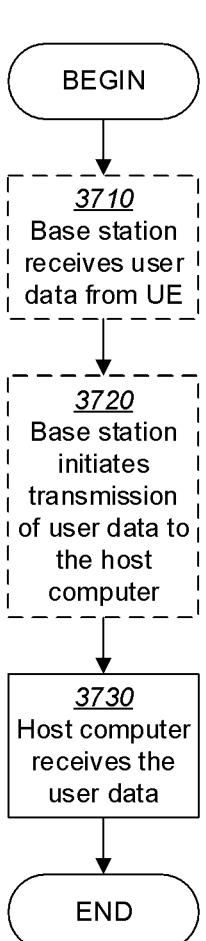

FIG. 17 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

| Abbreviation | Explanation |
| --- | --- |
| CG | Configured Grant |
| CP | Cyclic Prefix |
| ECP | Extended CP |
| NR | New radio |
| PUSCH | Physical Uplink Shared Channel |
| RACH | Random Access Channel |
| SCS | Subcarrier Spacing |
| SDT | Small Data Transmission |
| SSB | SS/PBCH block |

What is claimed is:

1. A method at a user equipment (UE) for managing time alignment (TA) related configuration, the method comprising:

receiving, from a network node, one or more TA related configurations, wherein the step of receiving comprises receiving a first TA related configuration used for a first configured grant (CG) configuration which is currently applied at the UE, wherein the first TA related configuration is used for all CG configurations configured at the UE comprising the first CG configuration;

determining a TA related configuration from the received one or more TA related configurations at least partially based on at least one of a beam in which the UE is currently camped, a reference signal which is currently detected by the UE, and a configured grant (CG) configuration which is currently applied at the UE; and applying the determined TA related configuration.

2. The method of claim 1, wherein the one or more TA related configurations are related to small data transmission (SDT) at the UE in a non-connected state.

3. The method of claim 1, wherein each of the one or more TA related configurations comprises one or more criteria for checking validity of a TA at the UE.

4. The method of claim 3, wherein the one or more criteria comprises at least one of:

a TA timer;

a Reference Signal Received Power (RSRP) related configuration;

a Reference Signal Received Quality (RSRQ) related configuration;

a Signal to Interference plus Noise Ratio (SINR) related configuration;

a Synchronous Signal Block (SSB) or Channel State Information Reference Signal (CSI-RS) related configuration; and a UE position related configuration.

5. The method of claim 1, wherein the one or more TA related configurations are received via one or more messages transmitted by the network node, wherein the one or more messages comprise at least one of:

a broadcasted Radio Resource Control (RRC) message;

an RRC message dedicated for the UE only;

a Medium Access Control (MAC) Protocol Data Unit (PDU) message; and a Downlink Control Information (DCI) message.

6. The method of claim 5, wherein the RRC message dedicated for the UE only is an RRC release message which triggers the UE to transition into an RRC INACTIVE state or an RRC IDLE state.

7. The method of claim 1, wherein the received one or more TA related configurations comprise multiple received TA related configurations, including the first TA related configuration, and wherein the step of determining a TA related configuration comprises: determining, from the multiple received TA related configurations, the first TA related configuration as the determined TA related configuration.

8. A user equipment (UE), comprising:

a processor;

a memory storing instructions which, when executed by the processor, cause the processor to perform operations comprising:

receiving, from a network node, one or more time alignment (TA) related configurations, wherein receiving the one or more TA related configurations comprises receiving a first TA related configuration used for a first configured grant (CG) configuration which is currently applied at the UE, wherein the first TA related configuration is used for all CG configurations configured at the UE comprising the first CG configuration;

determining a TA related configuration from the received one or more TA related configurations at least partially based on at least one of a beam in which the UE is currently camped, a reference signal which is currently detected by the UE, and a configured grant (CG) configuration which is currently applied at the UE; and applying the determined TA related configuration.

9. The UE of claim 8, wherein the received one or more TA related configurations comprise multiple received TA related configurations, including the first TA related configuration, and wherein the step of determining a TA related configuration comprises: determining, from the multiple received TA related configurations, the first TA related configuration as the determined TA related configuration.

10. The UE of claim 8, wherein the one or more TA related configurations are related to small data transmission (SDT) at the UE in a non-connected state.

11. The UE of claim 8, wherein each of the one or more TA related configurations comprises one or more criteria for checking validity of a TA at the UE.

12. The UE of claim 11, wherein the one or more criteria comprises at least one of:

a TA timer;

a Reference Signal Received Power (RSRP) related configuration;

a Reference Signal Received Quality (RSRQ) related configuration;

a Signal to Interference plus Noise Ratio (SINR) related configuration;

a Synchronous Signal Block (SSB) or Channel State Information Reference Signal (CSI-RS) related configuration; and a UE position related configuration.

13. The UE of claim 8, the memory storing instructions which, when executed by the processor, cause the processor receive the one or more TA related configurations via one or more messages transmitted by the network node, wherein the one or more messages comprise at least one of:

a broadcasted Radio Resource Control (RRC) message;

an RRC message dedicated for the UE only;

a Medium Access Control (MAC) Protocol Data Unit (PDU) message; and a Downlink Control Information (DCI) message.

14. The UE of claim 13, wherein the RRC message dedicated for the UE only is an RRC release message which triggers the UE to transition into an RRC INACTIVE state or an RRC IDLE state.

15. A method at a network node for managing time alignment (TA) related configuration for a user equipment (UE), the method comprising:

determining one or more TA related configurations for the UE at least partially based on at least one of one or more beams in which the UE is able to be camped, one or more reference signals which are able to be detected by the UE, and one or more configured grant (CG) configurations which are configured at the UE; and transmitting, to the UE, the determined one or more TA related configurations, wherein the step of transmitting comprises transmitting, to the UE, a first TA related configuration used for a first configured grant (CG) configuration which is currently applied at the UE, wherein the first TA related configuration is used for all CG configurations configured at the UE comprising the first CG configuration.

16. The method of claim 15, wherein the one or more TA related configurations are related to small data transmission (SDT) at the UE in a non-connected state.

17. The method of claim 15, wherein each of the one or more TA related configurations comprises one or more criteria for checking validity of a TA at the UE.

18. The method of claim 17, wherein the one or more criteria comprises at least one of:

a TA timer;

a Reference Signal Received Power (RSRP) related configuration;

a Reference Signal Received Quality (RSRQ) related configuration;

a Signal to Interference plus Noise Ratio (SINR) related configuration;

a Synchronous Signal Block (SSB) or Channel State Information Reference Signal (CSI-RS) related configuration; and a UE position related configuration.

19. The method of claim 15, wherein the one or more TA related configurations are received via one or more messages transmitted by the network node, wherein the one or more messages comprise at least one of:

a broadcasted Radio Resource Control (RRC) message;

an RRC message dedicated for the UE only;

a Medium Access Control (MAC) Protocol Data Unit (PDU) message; and a Downlink Control Information (DCI) message.

20. The method of claim 19, wherein the RRC message dedicated for the UE only is an RRC release message which triggers the UE to transition into an RRC INACTIVE state or an RRC IDLE state.

* * * * *